(12) United States Patent
Nederstigt

(10) Patent No.: US 9,505,146 B2
(45) Date of Patent: Nov. 29, 2016

(54) MOBILE APPARATUS AND METHOD FOR PRODUCING CONCRETE WITH COOLING OF BULK MATERIAL

(75) Inventor: Matthias Nederstigt, Buxtehude (DE)

(73) Assignee: LINTEC GMBH & CO. KG, Buxtehude (DE)

( * ) Notice: Subject to any disclaimer, the term of this patent is extended or adjusted under 35 U.S.C. 154(b) by 893 days.

(21) Appl. No.: 13/813,148

(22) PCT Filed: Jul. 26, 2011

(86) PCT No.: PCT/EP2011/062841
§ 371 (c)(1),
(2), (4) Date: Mar. 29, 2013

(87) PCT Pub. No.: WO2012/013684
PCT Pub. Date: Feb. 2, 2012

(65) Prior Publication Data
US 2013/0213060 A1    Aug. 22, 2013

(30) Foreign Application Priority Data

Jul. 29, 2010 (DE) .................... 20 2010 010 804 U

(51) Int. Cl.
*B28C 7/06* (2006.01)
*B28C 7/00* (2006.01)
(Continued)

(52) U.S. Cl.
CPC ........... *B28C 7/0038* (2013.01); *F16H 57/031* (2013.01); *F25D 25/04* (2013.01); *F28C 3/12* (2013.01); *F16H 57/0434* (2013.01); *F16H 2057/02069* (2013.01)

(58) Field of Classification Search
CPC ............................. B28C 7/0038; F25D 25/04
USPC ............................................................ 366/7
See application file for complete search history.

(56) References Cited

U.S. PATENT DOCUMENTS 1,205,323 A    11/1916  Cady
2,595,631 A *   5/1952  Bertsch ................. B28C 7/0038
                                                      134/25.1
(Continued)

FOREIGN PATENT DOCUMENTS

CN    2532966 Y    1/2003
CN    2764591 Y    3/2006
(Continued)

OTHER PUBLICATIONS

Search Report mailed Jan. 25, 2011, from German Application No. 202010010804.7 (5 pages).
(Continued)

*Primary Examiner* — Charles Cooley
(74) *Attorney, Agent, or Firm* — Kilpatrick Townsend & Stockton LLP

(57) ABSTRACT

The invention relates to a mobile apparatus and a method for concrete production, comprising a cooling apparatus for cooling bulk material, in particular aggregates for concrete production. The cooling apparatus (100) comprises a bulk material hopper (110), a wetting apparatus (120) and an air supply apparatus (130). The cooling apparatus has a bulk material feeder (140) for feeding bulk material into the bulk material hopper via a bulk material feeder path (141), the bulk material feeder and the wetting apparatus being adapted and disposed in such a way that bulk material to be fed comes into contact on at least one part of the bulk material feeder path with water that is being discharged from the wetting apparatus.

12 Claims, 19 Drawing Sheets

Figure 1:
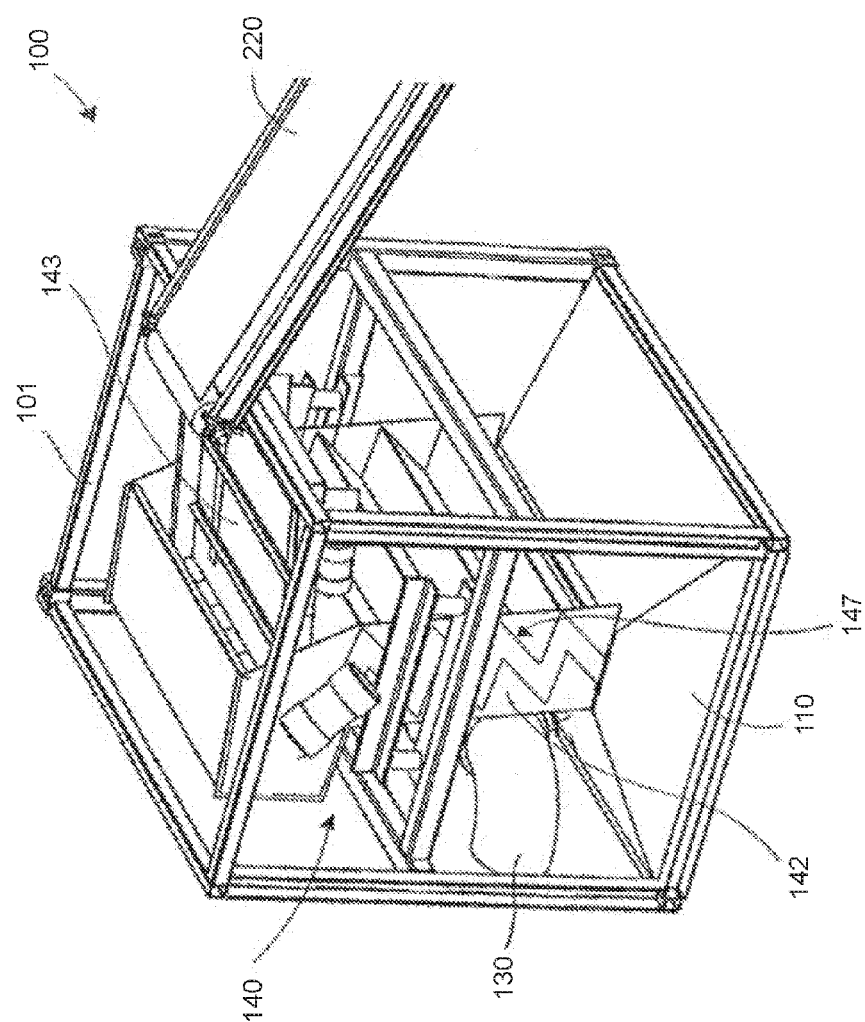

(51) Int. Cl.
  *F16H 57/031* (2012.01)
  *F28C 3/12* (2006.01)
  *F25D 25/04* (2006.01)
  *F16H 57/04* (2010.01)
  *F16H 57/02* (2012.01)

(56) References Cited

U.S. PATENT DOCUMENTS

| | | | | |
|---|---|---|---|---|
| 2,648,206 | A * | 8/1953 | Carr | B28C 7/0038 34/170 |
| 3,099,138 | A * | 7/1963 | Hightower | B28C 7/0038 222/1 |
| 3,108,448 | A * | 10/1963 | Hightower | B28C 5/04 366/7 |
| 3,150,496 | A * | 9/1964 | Hightower | B28C 7/0038 34/174 |
| 3,263,436 | A * | 8/1966 | Goldfarb | B28C 7/0038 34/403 |
| 3,277,664 | A * | 10/1966 | Goldfarb | B28C 7/0038 34/92 |
| 3,686,773 | A * | 8/1972 | Schreiner | F27D 15/0213 |
| 3,839,803 | A | 10/1974 | Dick | |
| 4,377,937 | A * | 3/1983 | Alquier | B22C 5/08 |
| 5,100,239 | A * | 3/1992 | Ono | B28C 5/468 366/108 |
| 5,152,605 | A * | 10/1992 | Yamada | B28C 7/0038 134/108 |
| 5,590,976 | A * | 1/1997 | Kilheffer | E01C 19/46 177/119 |
| 7,993,048 | B1 * | 8/2011 | Collette | E01C 19/1031 366/147 |
| 2013/0213060 | A1 * | 8/2013 | Nederstigt | B28C 7/0038 62/56 |

FOREIGN PATENT DOCUMENTS

| | | |
|---|---|---|
| DE | 29923531 U1 | 1/2001 |
| EP | 0 272 880 A1 | 6/1988 |
| FR | 2 489 489 A | 3/1982 |
| JP | 3-45303 A | 2/1991 |
| JP | 7-55493 B2 | 6/1995 |
| JP | 3-151211 B2 | 4/2001 |
| SE | 508265 C2 | 9/1998 |
| WO | 01/14115 A2 | 3/2001 |

OTHER PUBLICATIONS

International Preliminary Report on Patentability mailed Oct. 18, 2012, for PCT Application No. PCT/EP2011/062841 (18 pages).
First Office Action mailed Jul. 21, 2014, from Chinese Application No. 201180037349.7 (9 pages).
International Search Report mailed on Nov. 7, 2011, for PCT Patent Application No. PCT/EP2011/062841, 3 pages.
Examination and Search Report for Taiwan Application No. 100122934, dated Mar. 15, 2013, 10 pages.

* cited by examiner

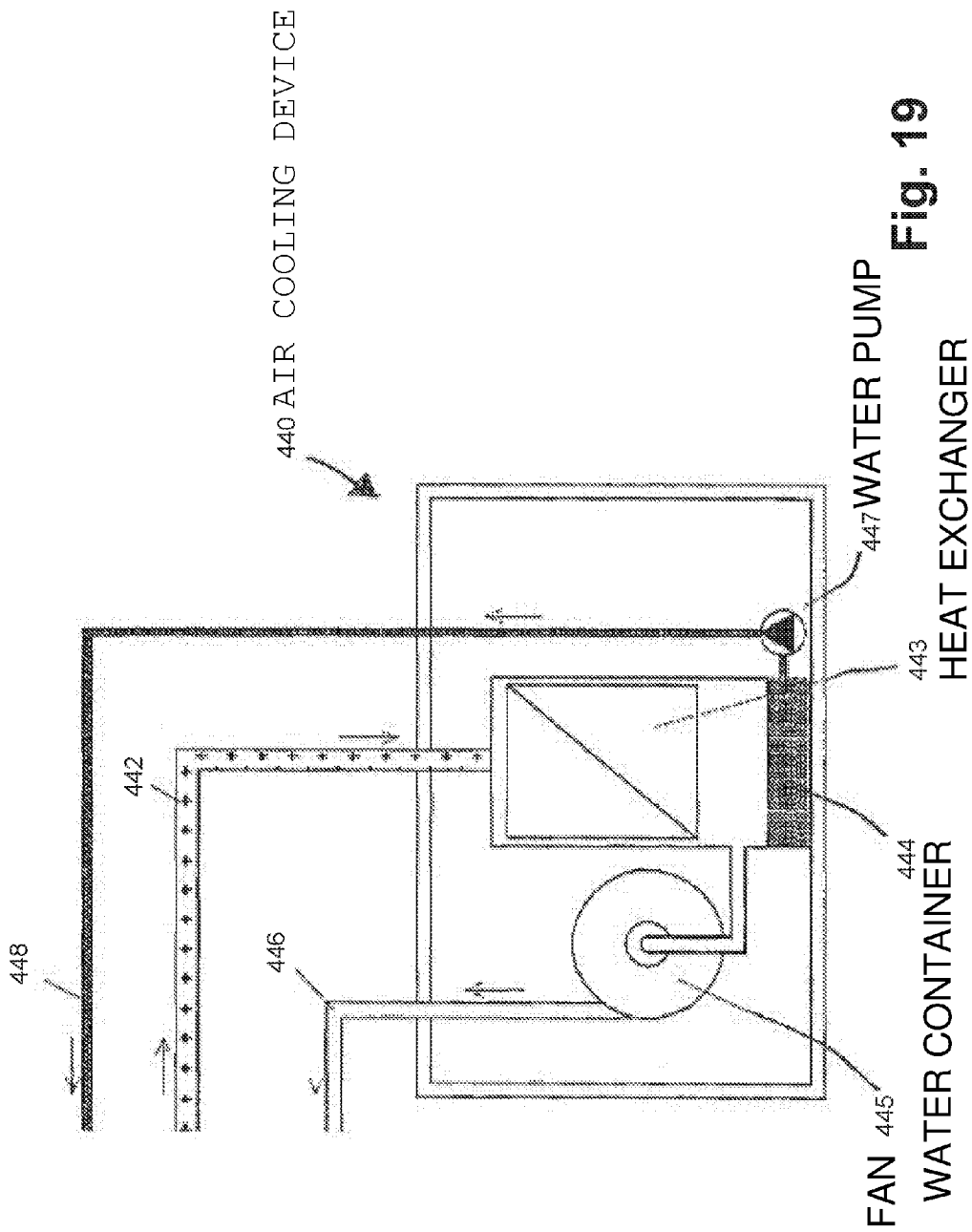

MOBILE APPARATUS AND METHOD FOR PRODUCING CONCRETE WITH COOLING OF BULK MATERIAL

This application is a U.S. National Phase under 35 USC 371 of PCT Application No. PCT/EP2011/062841 filed Jul. 26, 2011, which claims priority to the German Application No. 20 2010 010 804.7, filed Jul. 29, 2010, the disclosures of which are incorporated by reference herein.

The invention relates to a mobile device for concrete production, comprising a cooling apparatus for cooling bulk material, in particular aggregates for concrete production, the cooling apparatus comprising a bulk material hopper, a wetting apparatus and an air supply apparatus (130).

The invention also relates to a method for concrete production, in which bulk material, in particular aggregates for concrete production, are cooled, said cooling comprising the steps of: storing bulk material, wetting the bulk material with water and supplying air.

The invention further relates to a retrofit kit for adding to an existing aggregate processing plant, in particular a device for concrete production, comprising a device for cooling bulk material, in particular for cooling aggregates for concrete production, Mobile devices for concrete production, of the kind initially specified, are also referred to as mobile concrete mixing plants. They are preferentially deployed on building sites where large volumes of concrete are mixed. On such building sites, the supply of concrete cannot be guaranteed in the form of, or not exclusively in the form of fresh concrete delivered ready-mixed, so fresh concrete is produced in concrete mixing plants on site, i.e. on or in the vicinity of the building site. The fresh concrete made on site is normally then transported from the concrete mixing plant to the place within the building site where it is to be used. On large building sites, in particular, the distances involved are often more substantial.

The production of concrete on site is naturally only needed for as long as it takes to complete the respective building or structural shell. Once the building or structural shell is finished, there is no longer any necessity to produce concrete. For that reason, mobile devices for concrete production are often used because the service life of such concrete mixing plants is generally longer than the time taken to complete a building. If devices for concrete production are embodied as mobile devices, they can therefore be dismantled advantageously when a building site is finished, be transported to the next building site or to the next place of deployment, where they can be reassembled and put into operation. For this reason, it is preferred when the various components of a mobile apparatus for concrete production are simple to transport, erect and dismantle, and preferably are embodied as standardised containers at least partially and during transportation at least, or can be accommodated in such standardised containers. Such mobile devices for concrete production are known from DE 299 23 531 U1 and WO 2001 01 411 5 A2, for example.

The areas of application for mobile concrete mixing plants are wherever major building sites with a large demand for fresh concrete exist. This is the case practically worldwide, so mobile concrete mixing plants are used under very different geographical, climatic and economic conditions, where the availability of various resources can also vary greatly.

Bulk material is one of the components that are mixed in mobile concrete mixing plants. In the production of concrete, the bulk materials are usually concrete aggregates such as sand, gravel or grit. Bulk material is understood here to be a granular, i.e. grainy or pelletised material that is free-flowing. Bulk material thus consists of solid particles and a fluid (usually air) that fills the cavities between the particles. Different bulk materials differ in their grain size and/or particle size distributions, in their bulk density and their angle of repose. Bulk density is the ratio between the granular solid in the bulk material to a fluid (usually air in the case of concrete aggregates) which fills the cavities between the particles, i.e. the ratio of the mass of particles of bulk material to the total volume of the material.

Concrete, as a building material, is mainly composed of water, cement and concrete aggregates. Various kinds of rock or stone of different granulations or particle size distribution are used as aggregates, for example, sand, gravel or grit in many cases. During mixing and subsequent hardening or setting of concrete, cement and water react with each other, producing heat in the process. The intensity of heat production depends on various factors, in particular on the kind of cement being used, the water/cement ratio and on the geometry of the construction element being made. In the case of construction elements with a large volume in relation to a small surface, the generation of heat is particularly critical, for example, because only little heat can be dissipated on account of the relatively small surface. The higher the temperatures produced during binding, the greater the shrinkage that occurs when the concrete cools to the ambient temperature, as a result of which shrinkage the quality of the concrete can be adversely affected by cracking. Especially in regions with a hot climate, this effect can lead to problems because, in addition to the temperature-related effects that occur in any case, the starting materials and the fresh concrete itself already have a high temperature before they harden. A known way of improving the quality of concrete is therefore to cool the concrete before or during binding, thus preventing the concrete from reaching excessive temperatures during that phase.

One existing but very complex and expensive solution involves cooling the freshly mixed concrete with liquid nitrogen. Another known technique is to cool the water to be added to the concrete before it is added. However, the cooling effect is limited here by the amount of water that can be added to the concrete, and by a limited minimum water temperature of approximately 0° Celsius. In order to achieve better cooling, ice instead of water can be added to the concrete, but this option is likewise very complicated and expensive because a plant for producing, storing and dosing ice must then also be provided in the mobile device for concrete production. With this technique, the cooling effect is likewise limited by the maximum amount of ice that can be added to the concrete and by the minimum ice temperature that can still be achieved cost-efficiently. The production, storage and dosing of ice, particularly under very hot climatic conditions, also involves very high level of energy consumption.

Another possible way of cooling the concrete is to cool the aggregates before mixing the concrete. Here, too, one known method is to cool the aggregates with liquid nitrogen. However, as with cooling the fresh, ready-made concrete with liquid nitrogen, this method is very complicated and expensive.

Another possibility is to cool the aggregates with cold air. However, this variant has a very low degree of efficiency and hence a very high level of energy consumption. Major investments in a suitable plant, with conveyor belts, water supply, wastewater discharge and filtering are required to cool the aggregates with a water heat exchange process in which the aggregates are cooled with water. This disadvantage is exacerbated by the fact that separate heat exchangers must be provided for respective aggregates of different particle sizes, so as not to have to separate the different particle sizes later at considerable effort and expense in a sieving plant. Moreover, it is not possible with this method to cool fine-grained aggregates as well, such as sand.

Another solution, known from Swedish patent specification SE 508 265 C2, involves cooling aggregates by evaporating water. Here, the principle of evaporative cooling is applied to the aggregates by wetting the aggregates with water and making air flow through them. When water evaporates, it absorbs energy, i.e. it heats up, whereas the aggregate releases energy, i.e. heat. In the method described in SE 508 265 C2, aggregates in a ballast container or bulk material hopper are sprayed from above with water by a wetting apparatus. An air supply apparatus is disposed in the aggregate container and consists of a pipeline with air outlet openings through which air is blown into said aggregate container. The air flows through the aggregates and re-emerges from them at a higher temperature and with a higher moisture content. This kind of evaporative cooling has very low cooling efficiency, however, and is therefore suitable for moderate climates only. Nor is it possible to cool fine-grained aggregates, such as sand or fine gravel, evenly and sufficiently with this method.

The object of the present invention is therefore to provide an apparatus and method for producing concrete, comprising cooling of bulk material and a respective retrofit kit, by means of which one or more of the aforementioned disadvantages are reduced or eliminated.

Another particular object of the present invention is to provide an apparatus and a method for producing concrete, comprising cooling of bulk material and a respective retrofit kit, that are suitable for use in particularly hot climatic conditions. Yet another object of the present invention is to provide an apparatus and a method for production, comprising cooling of bulk material and a respective retrofit kit, which permit efficient and effective use of resources. More particularly, it is an object of the present invention to provide an apparatus and a method for concrete production, comprising cooling of bulk material and a respective retrofit kit, that are energy-saving. Another object of the present invention is to provide an apparatus and a method for concrete production, comprising bulk material cooling and a respective retrofit kit, that save water.

These objects are achieved, according to the invention, by a mobile apparatus for concrete production of the kind initially specified, characterised in that the cooling apparatus has a bulk material feeder for feeding bulk material into the bulk material hopper via a bulk material feeder path, the bulk material feeder and the wetting apparatus being adapted and disposed in such a way that bulk material to be fed comes into contact on at least one part of the bulk material feeder path with water that is being discharged from the wetting apparatus.

According to the invention, the bulk material is fed in the cooling apparatus into the bulk material hopper via a bulk material feeder. Inside said bulk material feeder, the bulk material covers a distance along the bulk material feeder path. In contrast to solutions known from the prior art, in which the bulk material is sprinkled with water in the bulk material hopper, the solution according to the invention solution specifies that the bulk material comes into contact with water from the wetting apparatus at an early stage, namely in the bulk material feeder, or more precisely on at least one part of the bulk material feeder path, rather than later, in the bulk material hopper.

The invention is based on the realization that wetting or soaking the bulk material as evenly as possible is essential for effective and uniform cooling of the bulk material. Such wetting, with maximum uniformity, of all the bulk material to be cooled is achieved according to the invention by wetting the bulk material with the water from the wetting apparatus while the bulk material is being fed into the bulk material hopper. During the feeding operation, the bulk material is substantially easier to wet uniformly than in the bulk material hopper itself. Bulk material which is in the bulk material hopper is usually densely packed, especially when the particle size is small, i.e. when there is little space between the individual particles. If this bulk material in the bulk material hopper is now sprinkled with water, as proposed in the prior art, what happens is that, depending on the path taken by the water through the cavities between the particles, not all regions of the bulk material come into contact with water. The more bulk material that is stored in the bulk material hopper, the greater the problems in wetting it thoroughly. In particular, any bulk material located in the bottom part of the bulk material hopper is usually not wetted sufficiently in the case of existing solutions. Bulk material with a very small range of particle sizes, such as fine sand, for example, cannot be uniformly wetted in this manner and is therefore not responsive to the evaporative cooling method.

The apparatus according to the invention solves these problems by wetting the particles of bulk material when feeding them into the bulk material hopper. In this way, the bulk material is already uniformly wetted when it enters the bulk material hopper, and wetting of the bulk material is no longer dependent on how good the water penetrates through the bulk material in the bulk material hopper and in what position individual particles of bulk material are located in the bulk material hopper.

The invention therefore has the advantages that more uniform and better wetting is achieved for all bulk materials and hence also that a more uniform, effective and efficient cooling of the bulk material is achieved. Another advantage of the invention is that aggregates with a small particle size, such as sand or fine gravel, are likewise responsive to evaporative cooling.

The invention can be developed by adapting and disposing the bulk material feeder in such a way that bulk material to be fed has a lower density at least on the one part of the bulk material feeder path than the bulk material in the bulk material hopper, wherein said density refers to the ratio of bulk material particles to air in a unit of volume.

The initially described bulk density of the bulk material refers to the ratio of the mass of bulk material particles to the volume of bulk material, which also includes air. This bulk density relates to bulk material in storage, i.e. in the present case to bulk material in the bulk material hopper. When the bulk material is being tipped or fed into something, however, the bulk material may be present in significantly looser form, i.e. the density of the bulk material is then lower because there are then fewer particles of bulk material in a unit of volume than in bulk material in storage. According to the invention, the bulk material feeder is embodied in such a way that the bulk material has a lower density on the bulk material feeder path than in the bulk material hopper, i.e., that the particles of bulk material are further apart from each other on the bulk material feeder path and that there are larger air-filled cavities between the particles of bulk material than in the bulk material stored in the bulk material hopper.

This makes it easier to wet the bulk material on at least one part of the bulk material feeder path, since the water exiting from the wetting apparatus can enter the cavities between the particles of bulk material more easily when the bulk material has a lower density. In this way, particularly uniform wetting is achieved, also of bulk material with a small particle size.

It is also preferred that the bulk material feeder includes a bulk material loosening device which is designed and disposed to reduce the density of bulk material to be fed compared to the density of bulk material in the bulk material hopper.

It is particularly preferred that the bulk material loosening device be designed as a vibrating conveyor. The bulk material is preferably conveyed on at least one part of the bulk material feeder path through the bulk material loosening device in the bulk material feeder. On a preferred vibrating conveyor, the bulk material is spread on a conveyor belt, as a result of which the density of the bulk material is reduced in comparison with its bulk density in the bulk material hopper, thus permitting more uniform and reliable soaking of the bulk material when it comes into contact, in the form loosened by the vibrating conveyor, with the water from the wetting apparatus.

The invention can be developed by adapting and disposing the bulk material feeder in such a way that, at least on the one part of the bulk material feeding line, the bulk material to be fed is guided on a path of movement which has a vertical component of movement, the path of movement preferably corresponding to free fall of the bulk material.

One particularly advantageous configuration of the invention consists in the bulk material performing an at least partly vertical movement on the one part of the bulk material feeder path. It is particularly preferred thereby if the particles of bulk material are in free fall in segments of the line at least. Due to an least partly vertical component of movement of the bulk material on the one part of the bulk material feeder path, the bulk material is loosened and/or its density reduced in a particularly simple manner, as a result of which the bulk material is soaked with water from the wetting apparatus simply, reliably and uniformly.

More particularly, it is preferred that bulk material which is to be fed on several parts of the bulk material feeder path is guided on a respective path of movement that has a vertical component of movement, the respective path of movement preferably corresponding substantially to free fall of the bulk material. Another particularly preferred embodiment is one in which one, two or more substantially horizontal floors are provided with drop zones disposed between the floors. It is also particularly preferred that the bulk material feeder comprise a zigzag vibrating conveyor that includes two or more substantially horizontal floors with drop sections disposed between the floors.

The flow of air around the particles of bulk material is particularly good due to the contrary directions of flow and movement of the bulk material and air thus achieved, and due to the vertical components of movement of the bulk material on several parts of the bulk material feeder path, thus achieving particularly efficient and effective cooling.

The invention can be developed by having the bulk material feeder include a bulk material feeder shaft which extends slantingly or perpendicularly upwards from the bulk material hopper.

In one preferred configuration of the invention, the bulk material feeder has a bulk material feeder shaft through which bulk material can be fed into the bulk material hopper from above. Orienting the bulk material feeder shaft substantially or partially upwards (perpendicularly or slantingly) has the advantage that a vertical component of movement of the bulk material on the bulk material feeder path is assured. It is particularly preferred that the bulk material feeder shaft form part of the bulk material feeder path. It is also particularly preferred that a bulk material loosening device, for example a vibrating conveyor, be disposed upstream from the bulk material feeder shaft in the bulk material feeder. The bulk material feeder shaft may be configured as a pipeline and may, for example, be of round or angular cross-section. A bulk material feeder shaft according to the invention is preferably very robust and low-wearing, which is particularly advantageous when used on building sites and for processing bulk material.

This development of the invention is particularly preferred in combination with the previously described development of the invention, in which the several parts of the bulk material feeder path comprising paths of movement with vertical components of movement are preferably located in the bulk material feeder shaft and in which a vibrating conveyor may also be disposed in the bulk material feeder shaft.

Another preferred development of the invention is one in which an air cooling device is provided for cooling the air which is to be supplied by means of the air supply apparatus.

It is particularly preferred that the air fed to the cooling apparatus by the air supply apparatus is cooled in an air cooling device before it supplied. The colder the air supplied, the greater the cooling efficiency of the cooling apparatus and the more the bulk material is cooled. In this way, the invention can also be used in countries with a very hot climate, where such strong cooling of the aggregates is necessary. In such countries, cooling is mostly insufficient because of evaporative cooling without cooled air, which means that evaporative cooling cannot be deployed there. Without pre-cooling of the air to be supplied, as required by the invention, it does not make sense to apply the principle of evaporative cooling under such hot climatic conditions. The development of the invention thus offers the advantage of being able to apply evaporative cooling to bulk material even in very hot countries. Another advantage of the solution according to the invention is that the air can be cooled immediately before it is supplied, thus obviating the need for complex equipment to produce and store ice or liquid nitrogen, for example. Although upstream cooling of the air to be supplied may increase the amount of energy consumed in cooling the bulk material, the solution according to the invention is a very efficient solution compared to other existing options for cooling bulk material, even with this increased energy requirement.

The invention can be developed by having the air cooling device include an air dryer for drying the air to be supplied by means of the air supply apparatus.

Another way of increasing the cooling power is to dry the air to be supplied by the air supply apparatus to the cooling apparatus before the air is actually supplied. The drier the air being supplied, the greater the cooling power when the principle of evaporative cooling is applied. This air drying may be carried out, like the air cooling, immediately before the air is supplied, which again obviates the need for investments in equipment for producing and storing ice or liquid nitrogen, for example. By increasing the cooling power, this development of the invention thus allows the use of evaporative cooling even in regions with very hot climatic conditions.

It is particularly preferred in this regard that the air to be supplied be cooled as well as dried before it is supplied. The advantage of these two variants of the invention are then complementary and mutually reinforcing, so the combination of air cooling and air drying is a particularly preferred variant of the invention. It is also preferred that the air cooling device be configured not only to cool the air to be supplied, but also to dry it by means of a drying device. Alternatively, an air dryer and an air cooling device may be separately embodied and connected to each other one behind the other in series.

The invention is preferably developed by adding an air discharge apparatus.

The air fed to the cooling apparatus flows through the soaked bulk material or flows around the wetted particles of bulk material before it is subsequently discharged from the cooling apparatus with a higher temperature and a higher humidity. It is preferred in this regard that the air being discharged is received at least partially by an air discharge apparatus. This has the advantage that the air to be discharged is systematically received and can therefore be made available for further use or for specific discharge or disposal.

The invention may be developed in such a way that the wetting apparatus, the air discharge apparatus and the air cooling device are adapted and disposed in such a way that an air outlet of the air discharge apparatus is connected to an air inlet of the air cooling device and a water outlet of the air cooling device is connected to a water inlet of the wetting apparatus.

In hot regions in particular, and/or in regions with water scarcity, thrifty use of water resources is of special importance when cooling bulk material. According to this development of the invention, it is therefore preferred that the waste air be cooled and that the condensing water be recycled to the device. In this way, at least one part of the water fed to the device can be recovered by cooling the waste air, as a result of which the device consumes significantly less water. Furthermore, when recovering water by cooling the waste air, there is no need for complex processing of the wastewater recovered by cooling and drying, in contrast to water recovery involving direct water cooling of the aggregates by direct exchange of heat between water and the aggregates, since the wastewater is present as water vapour in the waste air and for that reason does not contain any suspended matter or the like, or only very little.

The invention can be further developed by adapting and disposing the air supply apparatus, the air discharge apparatus and the air cooling device in such a way that an air outlet of the air discharge apparatus is connected to an air inlet of the air cooling device and an air outlet of the air cooling device is connected to an air inlet of the air supply apparatus.

According to this development of the invention, the waste air discharged from the cooling apparatus via the air supply apparatus is at least partially recycled to the cooling apparatus and is cooled and/or dried therebetween. This development has the advantage that an air circulation is established, in which the air used for cooling is re-used least partially. Another advantage of this invention is that not only is the air used, or at least part of it, is recycled via the air discharge apparatus and made available for continued use, but also that the water supplied and present as water vapour in said waste air, or at least part of said water, is not discharged to the surroundings, but is captured by the air discharge apparatus. Due to the waste air being cooled and dried, at least part of the water can be recovered and made available for continued use. Although the energy consumption is increased on account of the warm, relatively humid waste air having to be cooled and dried, an opportunity to recover and re-use the supplied water is simultaneously created. This variant is especially advantageous in regions with water scarcity. Furthermore, when recovering water by cooling the waste air, there is no need for complex processing of the wastewater recovered by cooling and drying, in contrast to water recovery involving direct water cooling of the aggregates by direct exchange of heat between water and the aggregates, since the wastewater is present as water vapour in the waste air and for that reason does not contain any suspended matter or the like, or only very little. This development of the invention is particularly preferred when the discharged waste air has a lower temperature than the ambient air.

The invention is preferably developed by adding a water cooling device for cooling the water to be supplied by means of the wetting apparatus.

Another possibility for increasing the cooling power is to cool the water to be supplied before it is supplied to the apparatus. The colder the water to be supplied, the greater the cooling power of the evaporative cooling. This advantageous development is used particularly in regions in which there is a greater need for cooling, due to especially warm climatic conditions, or when the warm wastewater recovered from the waste air is to be fed back to the wetting apparatus and has to be cooled beforehand.

The invention is preferably developed by adapting and disposing the air cooling device and the wetting apparatus in such a way that a water outlet of the air cooling device is connected to a water inlet of the wetting apparatus, the water outlet of the air cooling device preferably being connected via a water cooling device to the water inlet of the wetting apparatus.

According to this preferred development of the invention, a water circuit is provided in which the water obtained from cooling and/or drying the waste air is fed back at least partially to the wetting apparatus. It is particularly preferred in this regard that the water recovered by cooling and/or drying the waste air is firstly cooled, before it is fed back to the wetting apparatus.

The invention is preferably developed by adding a water cooling circuit in which the following components are arranged in series: a fresh water tank, preferably a precooler, a chiller, a cold water tank and an air cooling device, the water circuit and its components being adapted and disposed in such a way that a water inlet of the air cooling device is connected to a water outlet of the cold water tank and/or a water outlet of the air cooling device is connected a water inlet of the fresh water tank and/or a water outlet of the cold water tank is connected to a water inlet of the wetting apparatus.

In hot regions and/or in regions with water scarcity, efficient water cooling is of special importance in cooling bulk material. The arrangement according to the invention has proved to be especially advantageous in that context. It shall now be described with reference to an example, the temperatures and humidity figures specified in the following relating to conditions in which aggregates stored in the surroundings have a temperature of approximately 40-50° C. and the ambient air has a temperature of approximately 30-45° C., with a relative humidity of approximately 50-70%. Under such climatic conditions, the waste air from the cooling apparatus has a temperature of approximately 40-50° C. and a relative humidity of almost 100%.

By means of the inventive apparatus, in particular in this preferred development, the bulk material can be cooled from an initial temperature of about 40-50° C. to a temperature of approximately 15-25° C. or less.

Water at a temperature of between approximately 35° C. and 45° C. is provided in a fresh water tank, and a precooler in which the fresh water is cooled to a temperature lower than 30° C. is optionally provided downstream from the fresh water tank, particularly when the water temperature is more than 30° C. Downstream from the precooler—or directly downstream from the fresh water tank in variants without a precooler—there is a "chiller" in which the water is cooled to a temperature of approximately 5 to 15° C. and from which the water is then fed into a cold water tank with a water temperature of approximately 4 to 15° C. A particularly preferred embodiment is one in which a "subcooling circuit" is provided between the cold water tank and the chiller, in which the water from the cold water tank is fed once again to the chiller for further cooling.

Water is now taken from the cold water tank for the wetting apparatus and for air cooling. Either external and/or ambient air is fed to the air cooling device, or—in one variant with water recovery—waste air is fed from the cooling apparatus. In the latter case, water at a temperature of approximately 30-40° C. which has been recovered from the waste air by cooling or drying it is subsequently fed to the fresh water tank and, if the volume of water recovered from the waste air is not sufficient, is mixed in the fresh water tank with fresh water which has been additionally supplied.

Another aspect of the invention is a method, of the kind initially specified, for producing concrete, said method being characterised in that cooling includes the step of feeding bulk material via a bulk material feeder path, the wetting step being performed on at least one part of the bulk material feeder path.

The method according to the invention may be developed in accordance with claims 15 to 22. These developed methods have features and/or steps that make them specifically suitable for being used in an apparatus and its further developments according to the invention. With regard to the embodiments, specific features, variants and advantages of the features of said method and the further developments thereof, reference is made to the above description of the respective features of the apparatus.

Yet another aspect of the invention is a retrofit kit of the kind initially specified for adding to an existing aggregate processing plant, said retrofit kit being characterised in that it comprises retrofit components that correspond to the features of the inventive cooling apparatus for cooling bulk material, as described in the foregoing.

The idea of invention is not limited to newly installed mobile devices for concrete production, but may also be applied advantageously for retrofitting existing mobile or stationary devices for producing concrete. Due to the long service life of concrete mixing plants, the large amounts of investment involved and the large number of concrete mixing plants in existence, it is advantageous to make the advantages associated with the invention available by providing a retrofit kit for existing concrete mixing plants. It is particularly advantageous to use the retrofit kit in mobile concrete mixing plants, since these are usually modular in design and a retrofit kit is therefore easily integrated in them as an additional module. It is particularly preferred that the retrofit kit be provided in one or more standard containers so that the retrofit kit is simple to transport.

The retrofit kit according to the invention may be further developed to include the features of the cooling apparatus for cooling bulk material, as described in the foregoing, in particular for cooling aggregates for concrete production in an apparatus for concrete production. With regard to the embodiments, specific features, variants and advantages of the features of said retrofit kit and the further developments thereof, reference is made to the description of the respective device features as provided in the foregoing.

Figure 2:
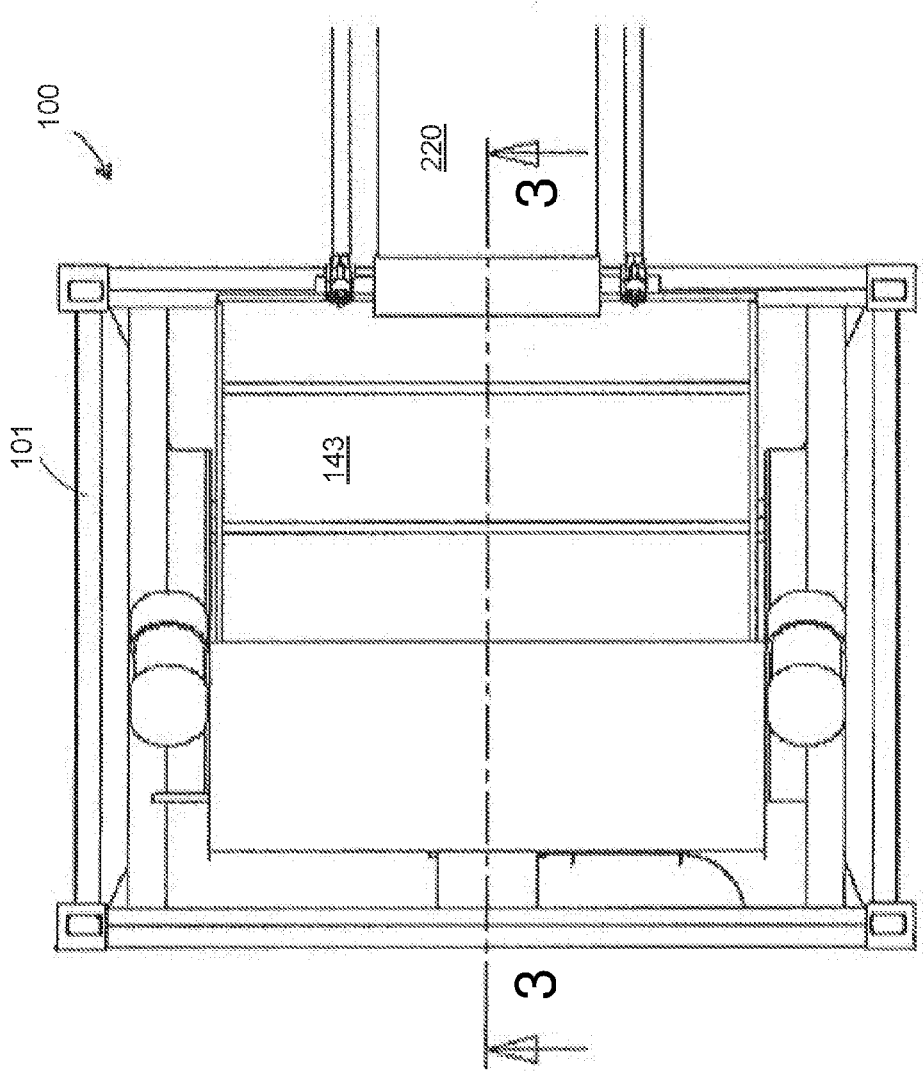
Figure 3:
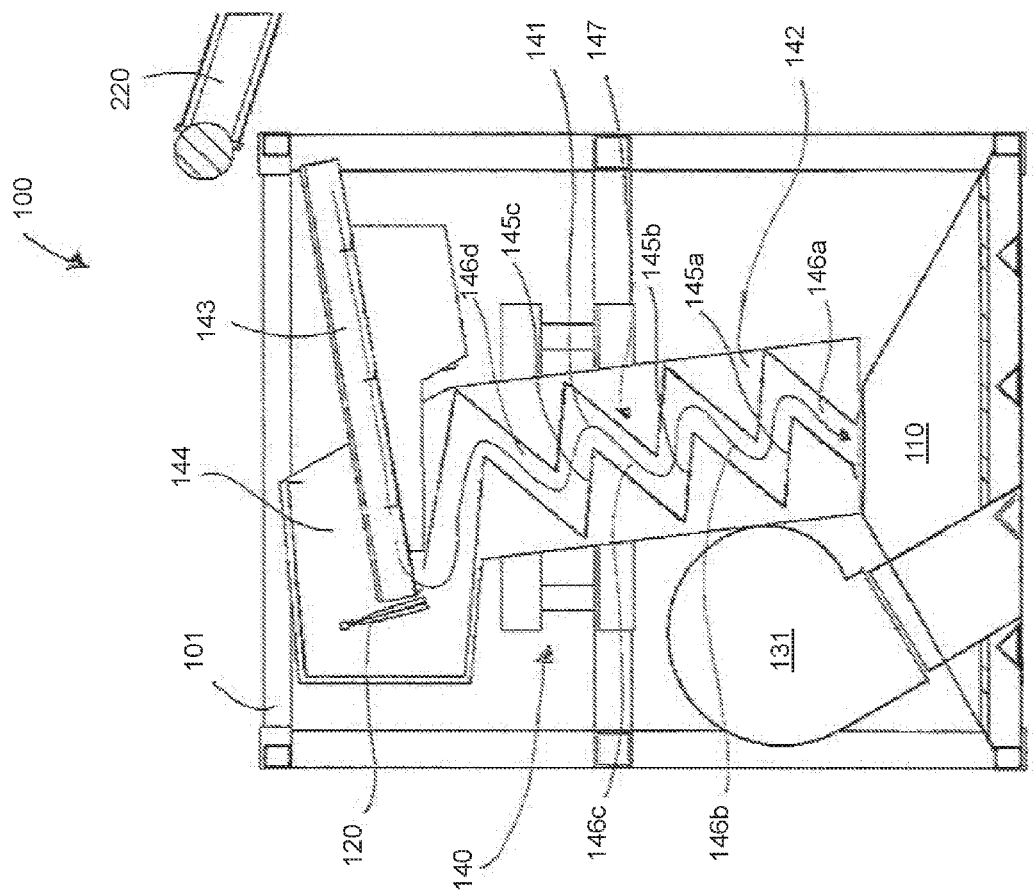
Figure 4:
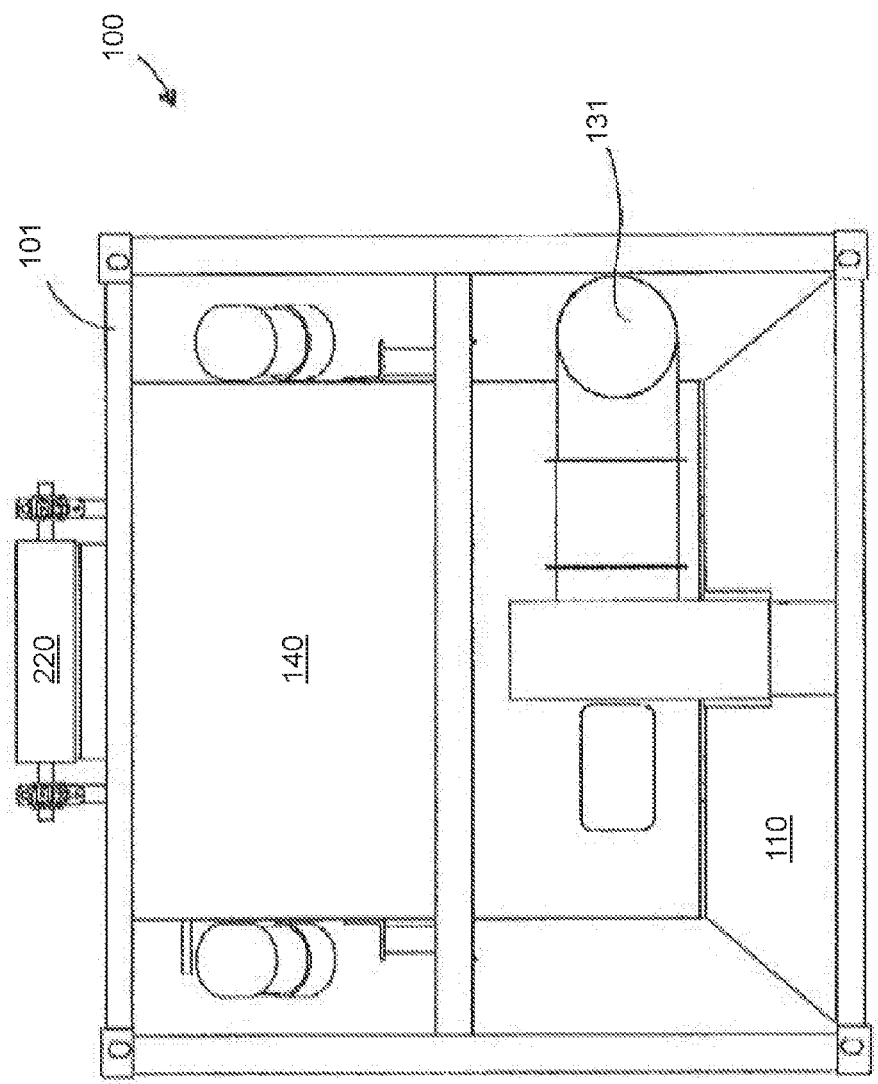
Figure 5:
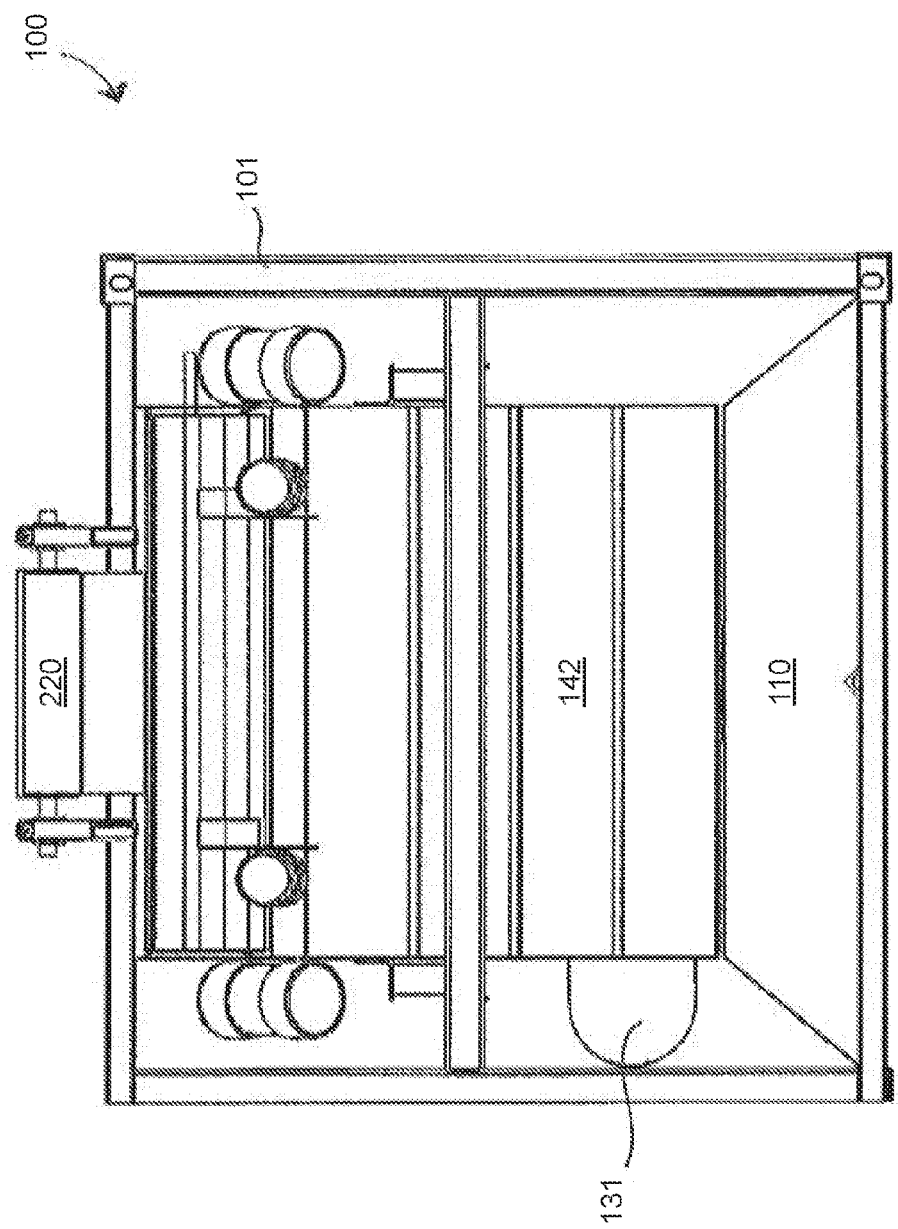
Figure 6:
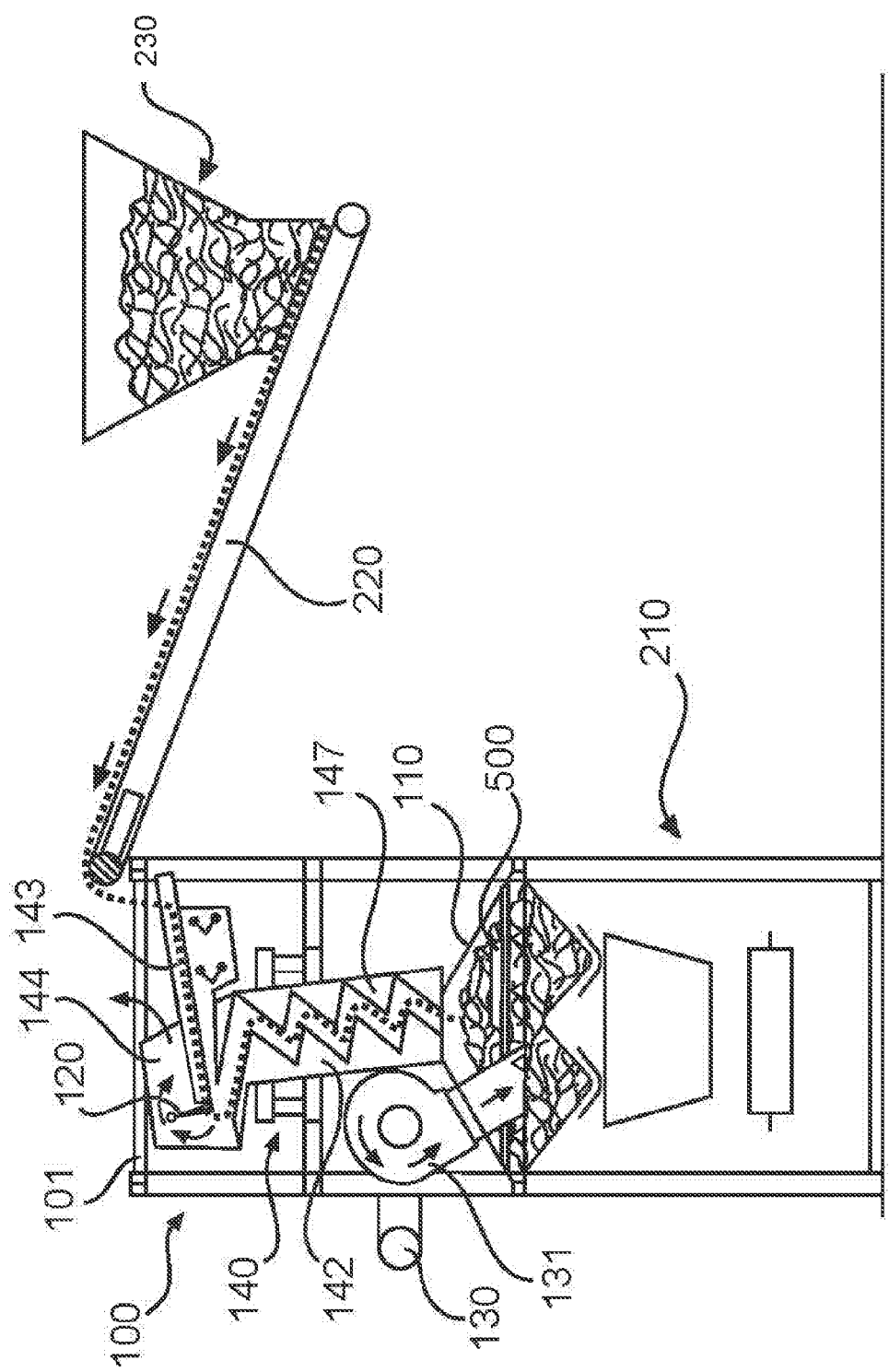
Figure 7:
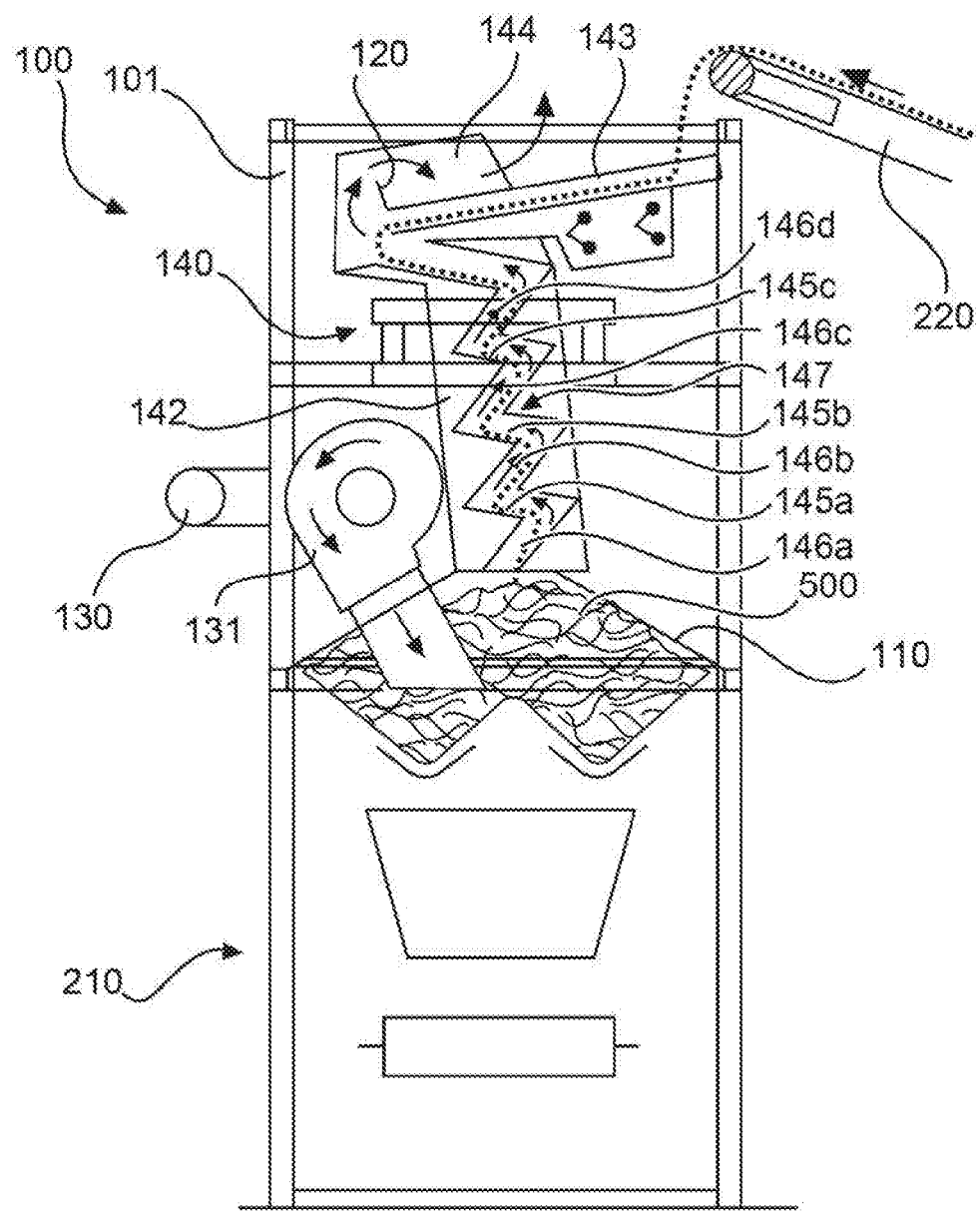
Figure 8:
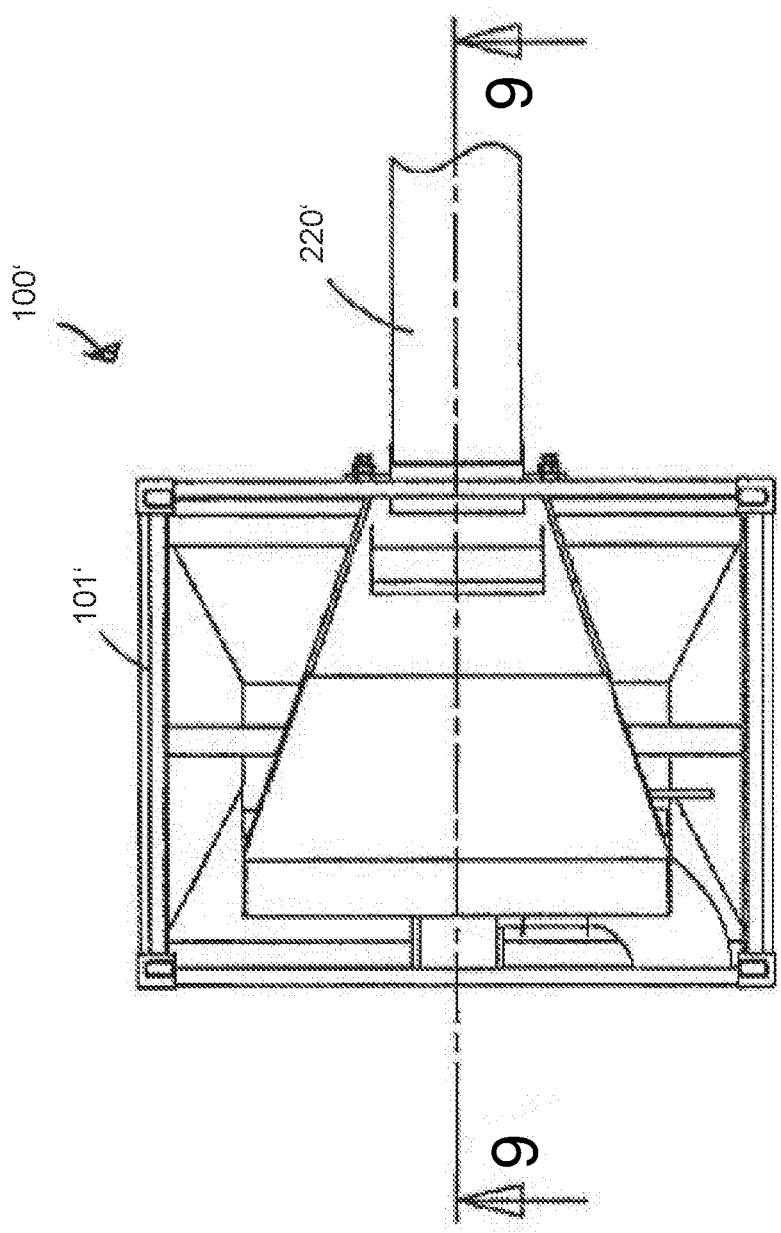
Figure 9:
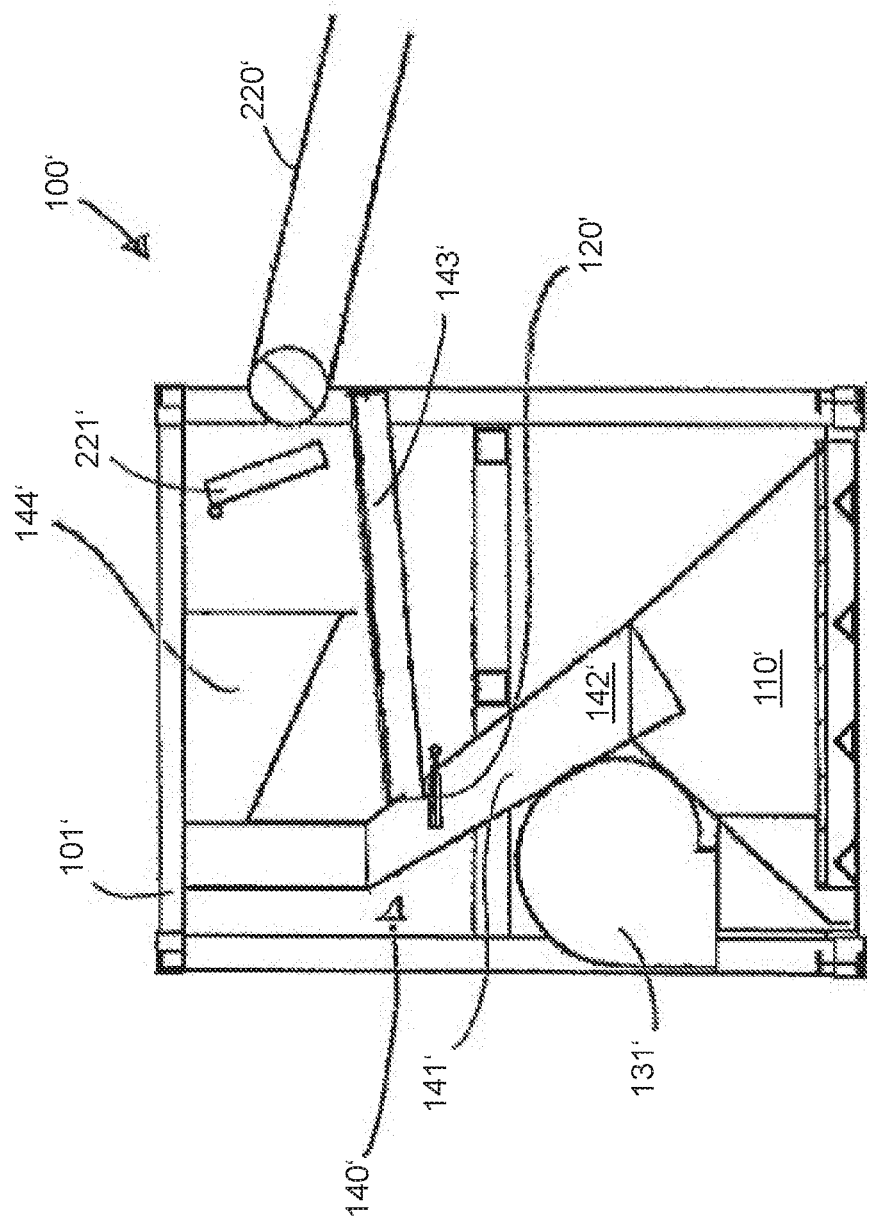
Figure 10:
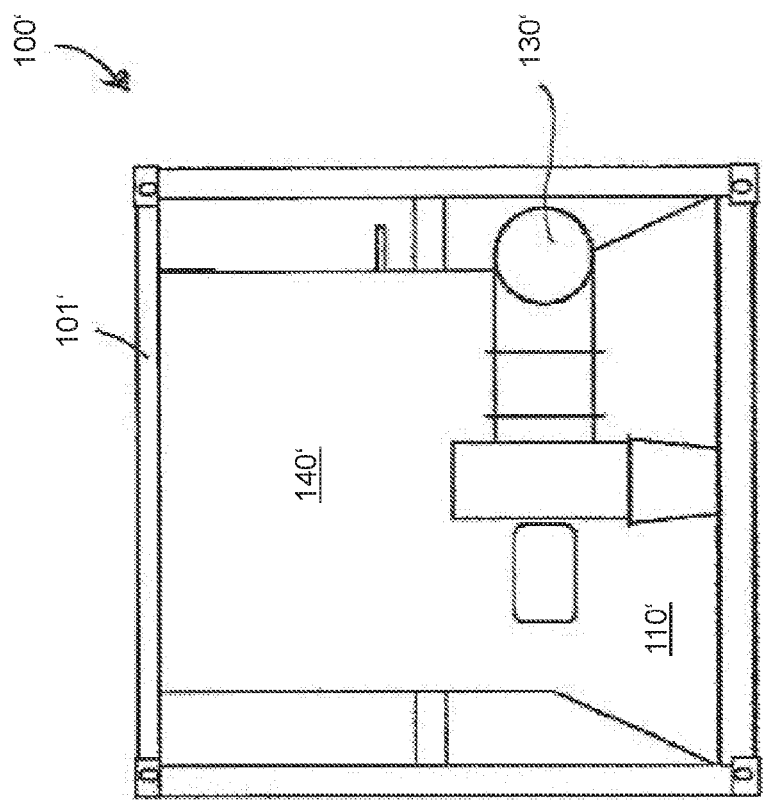
Figure 11:
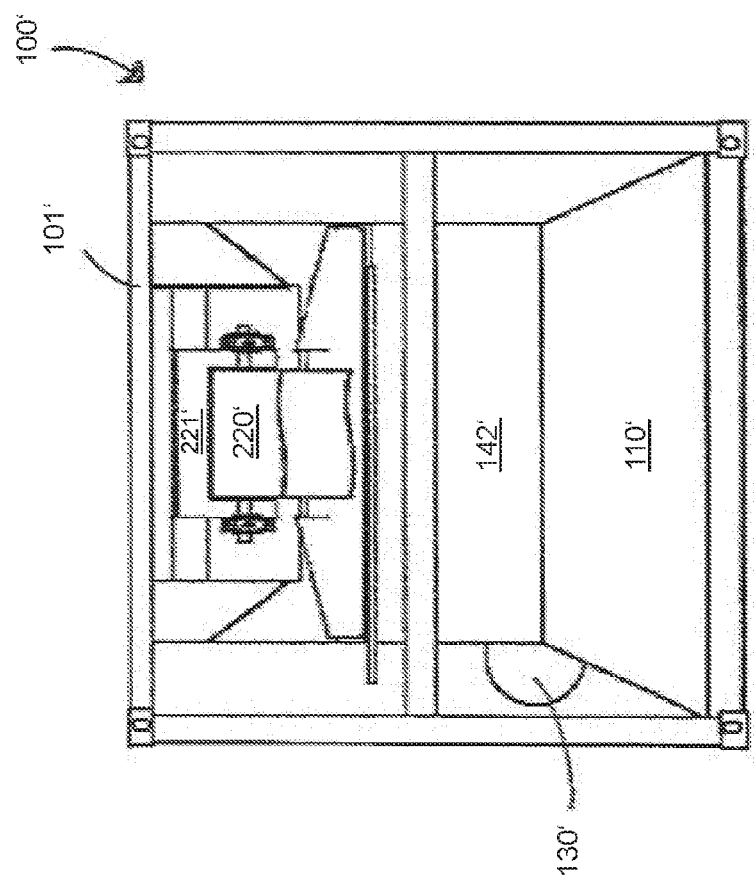
Figure 12:
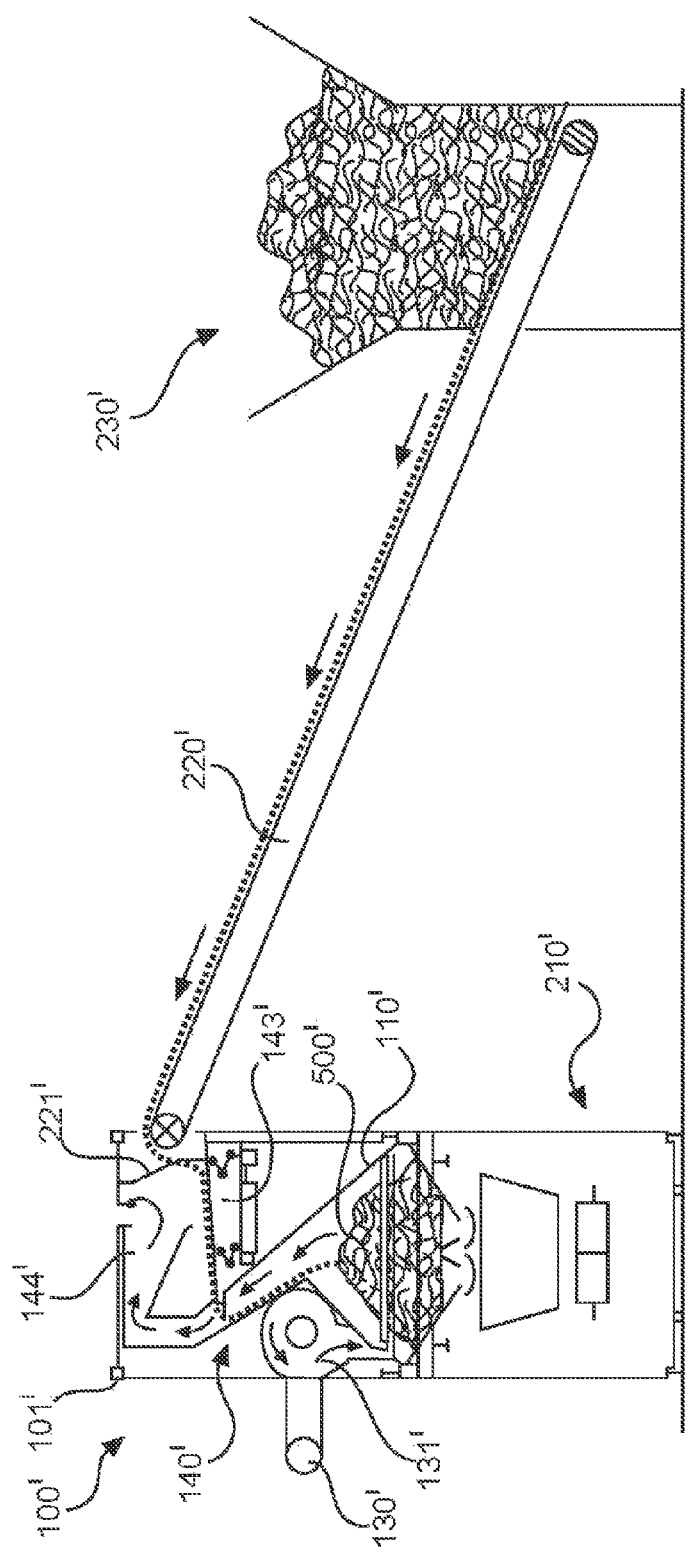
Figure 13:
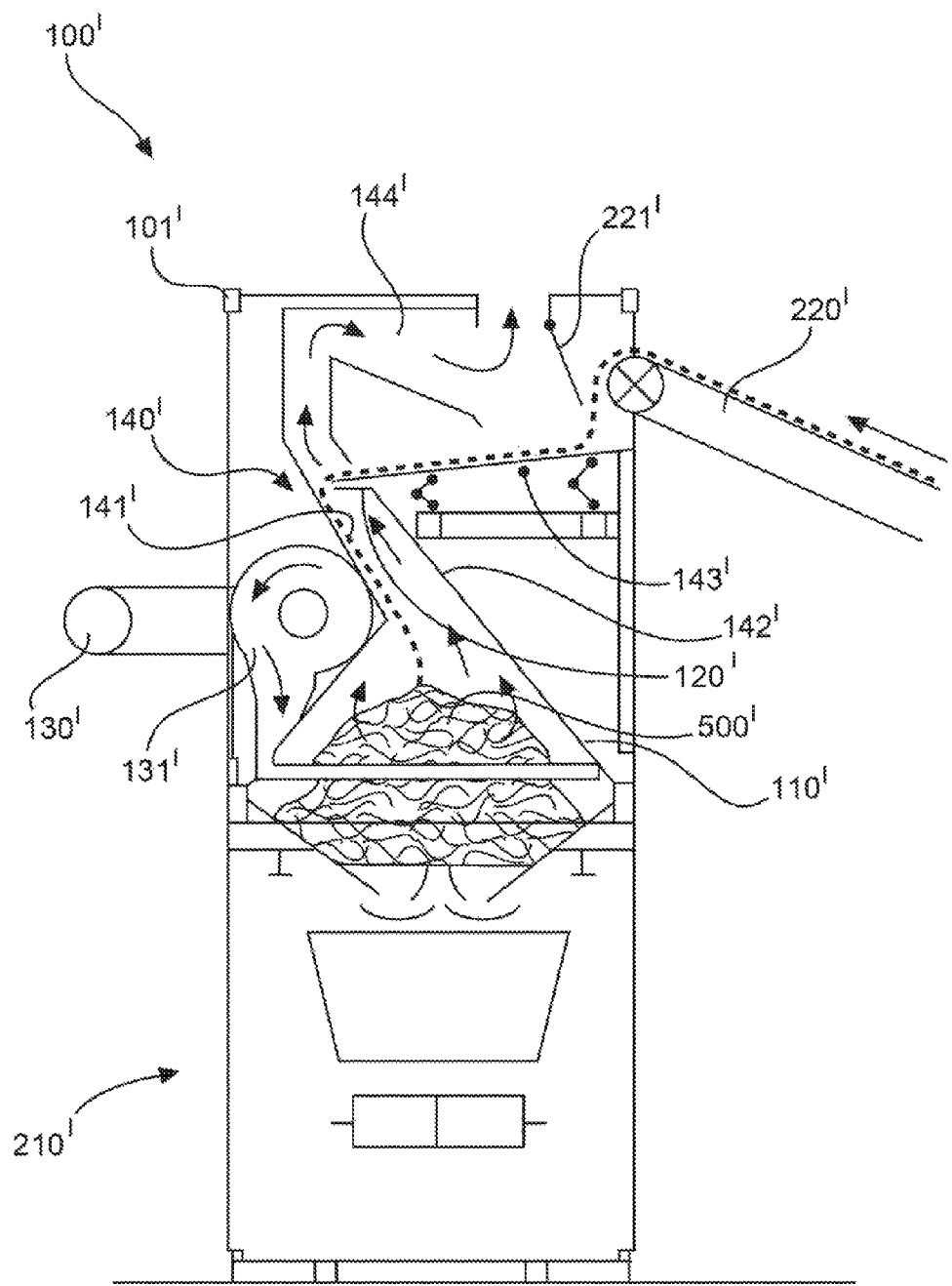
Figure 14:
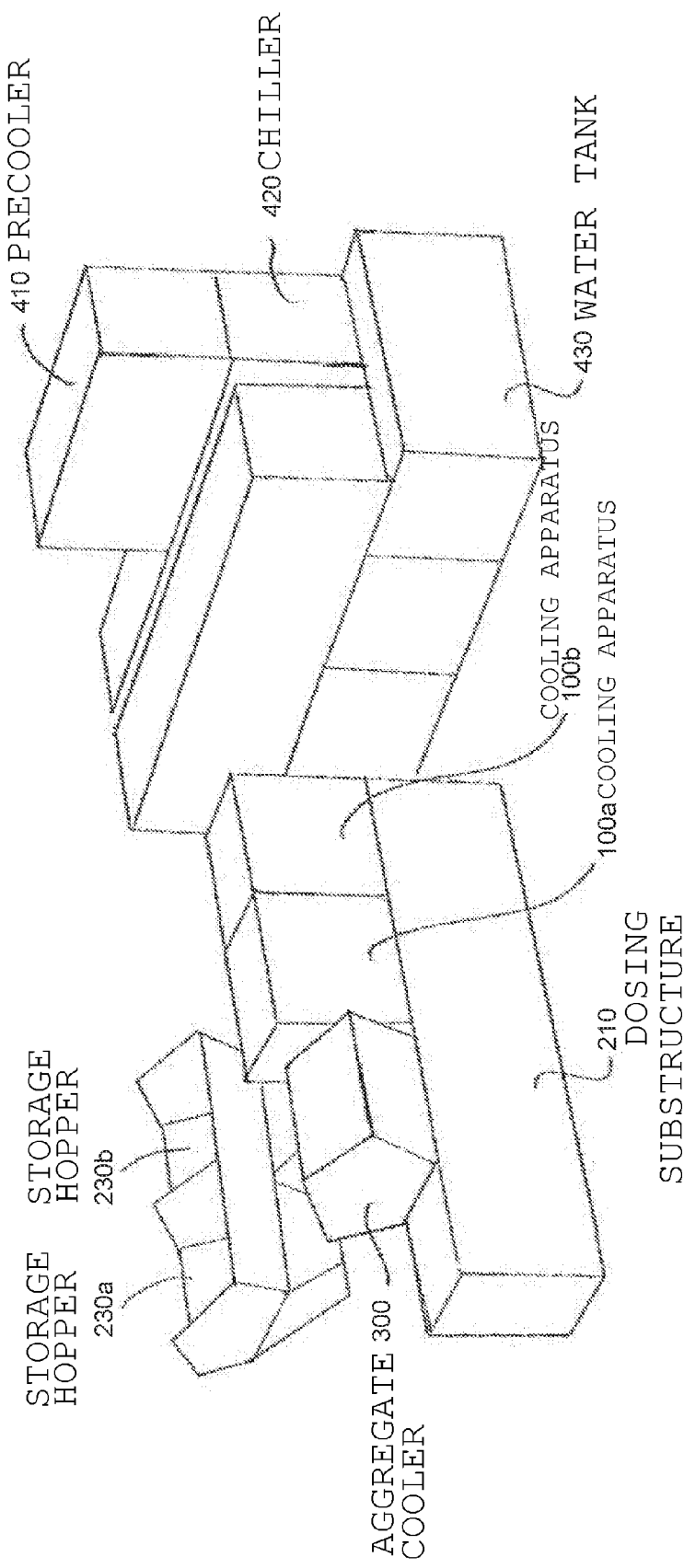
Figure 15:
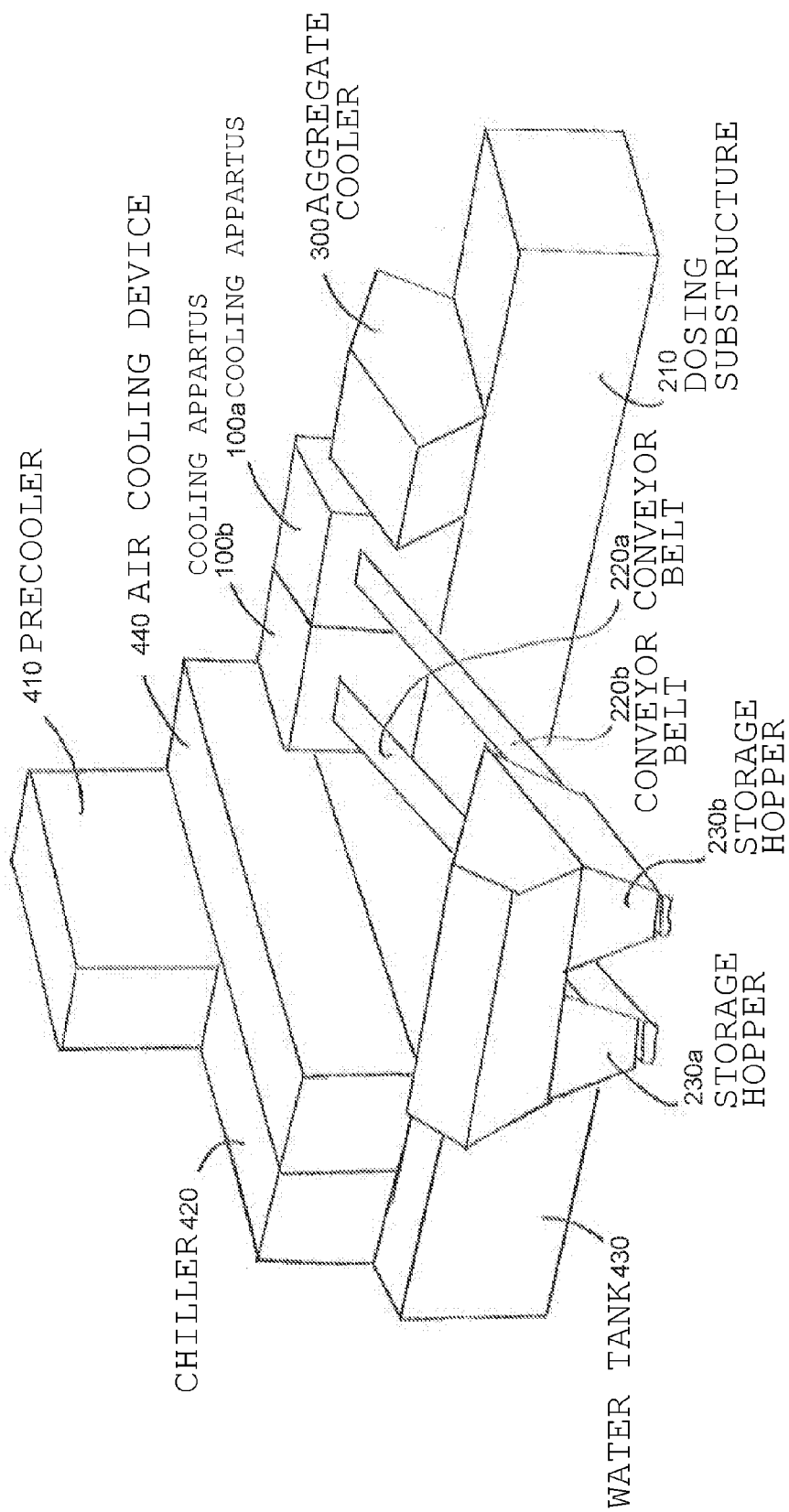
Figure 16:
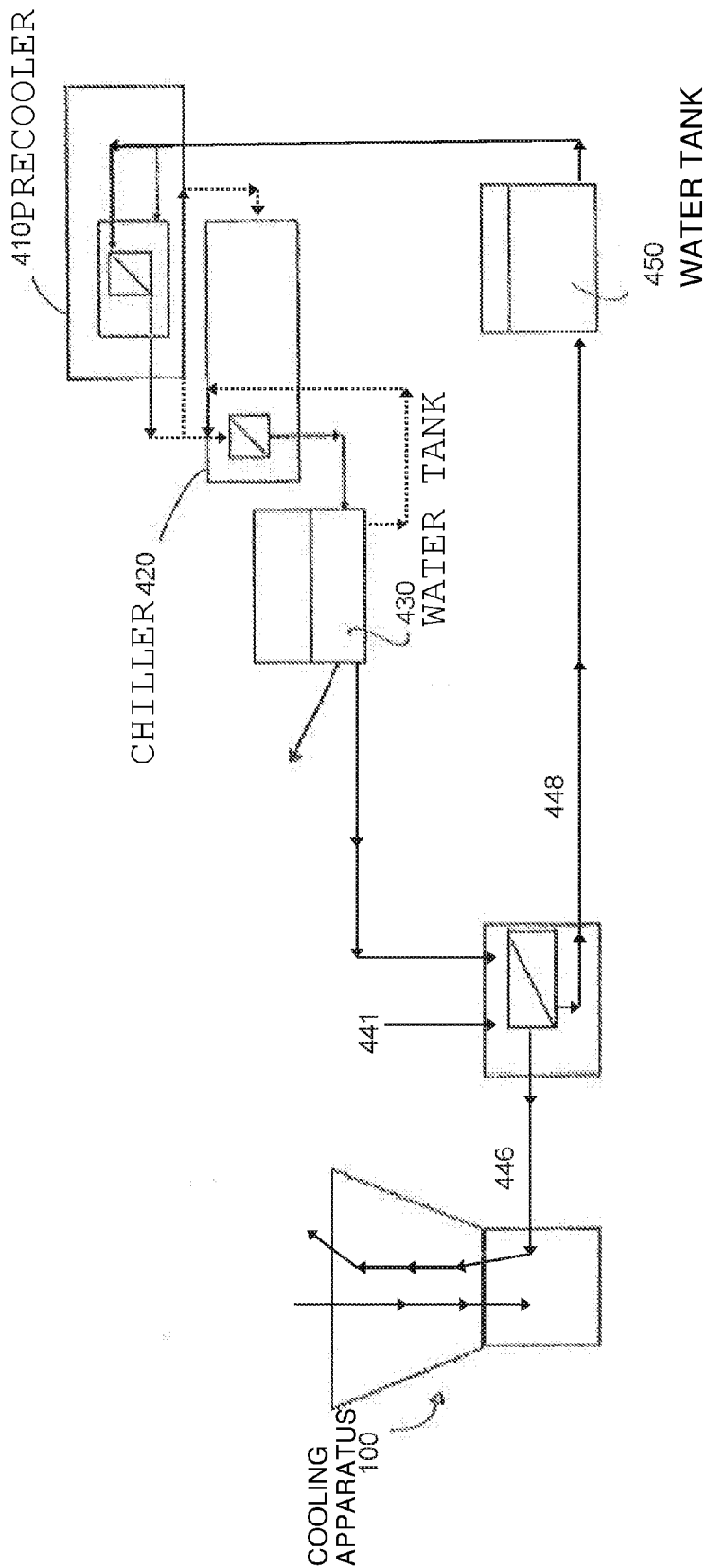
Figure 17:
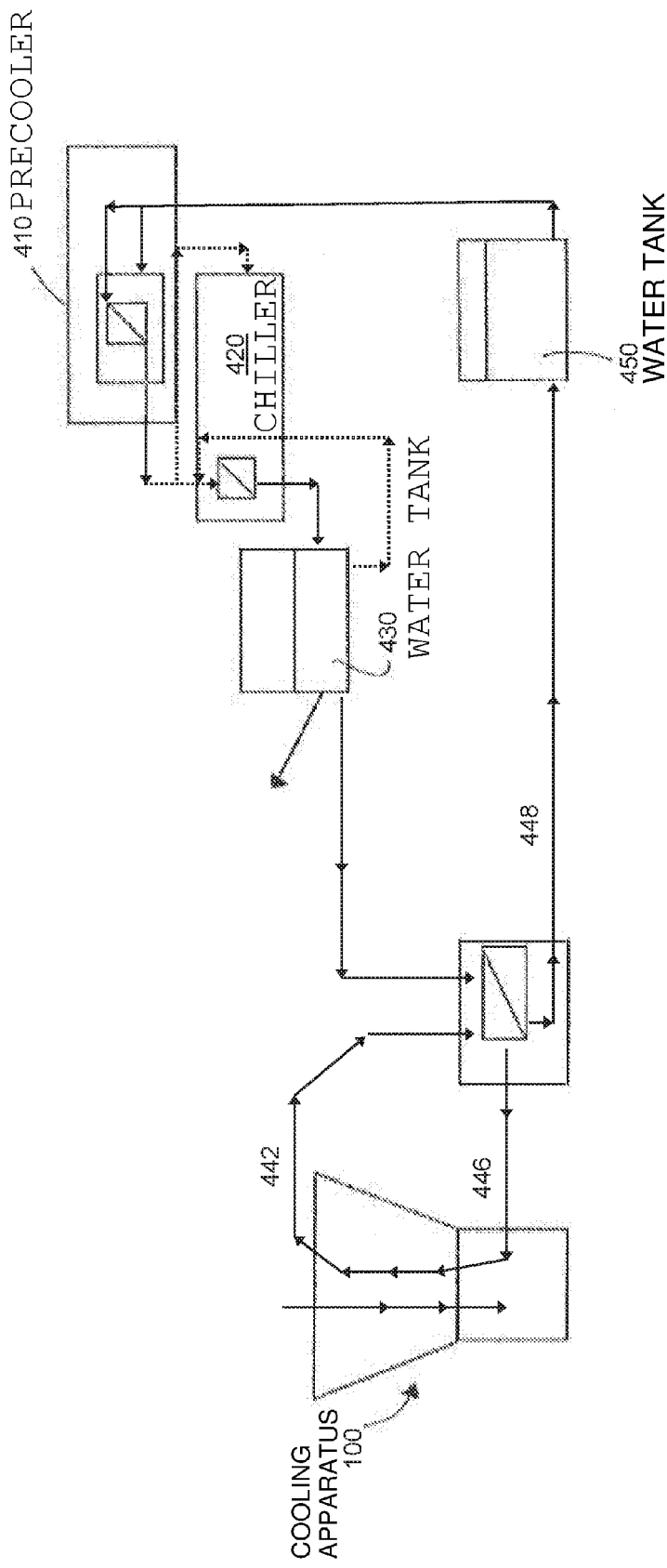
Figure 18:
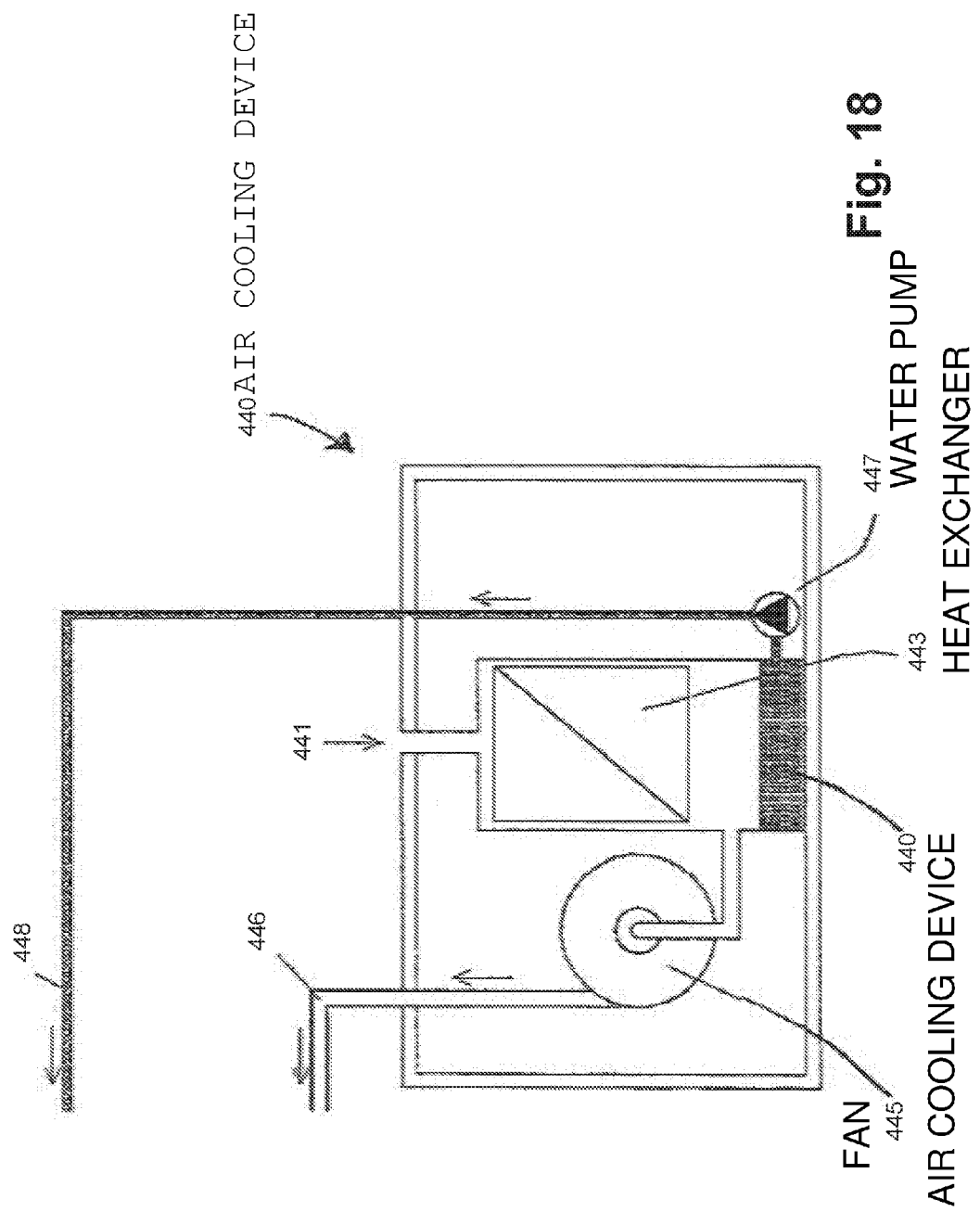

A preferred embodiment of the invention shall now be described with reference to the Figures, in which:

FIG. 1: shows a three-dimensional view of a schematic representation of a first exemplary embodiment of a cooling apparatus for a mobile apparatus for concrete production;

FIG. 2: shows a plan view of the cooling apparatus according to FIG. 1;

FIG. 3: shows a cross-sectional view along the sectional plane 3-3 in FIG. 2 through the cooling apparatus according to FIG. 1;

FIG. 4: shows a rear view of the cooling apparatus according to FIG. 1;

FIG. 5: shows a front view of the cooling apparatus according to FIG. 1;

FIG. 6: shows a cross-section through cooling apparatus according to FIG. 1, with additional components of a mobile apparatus for concrete production;

FIG. 7: shows an enlargement of a cross-section according to FIG. 6;

FIG. 8: shows a plan view of a second exemplary embodiment of a cooling apparatus for a mobile apparatus for concrete production;

FIG. 9: shows a cross-sectional view along the sectional plane 8-8 according to FIG. 8;

FIG. 10: shows a rear view of the second exemplary embodiment of a cooling apparatus;

FIG. 11: shows a front view of the second exemplary embodiment of a cooling apparatus;

FIG. 12: shows a cross-section through the second exemplary embodiment of a cooling apparatus with additional components of a mobile apparatus for concrete production;

FIG. 13: shows an enlargement of a cross-section according to FIG. 12;

FIG. 14: shows an exemplary embodiment of a part of a mobile apparatus for concrete production according to the invention, in a three-dimensional schematic view;

FIG. 15: shows another three-dimensional view of a part of the mobile apparatus for mobile concrete production according to FIG. 14;

FIG. 16: shows a schematic view of an exemplary embodiment of a cooling circuit according to the invention, without water recovery;

FIG. 17: shows a schematic view of an exemplary embodiment of a cooling circuit according to the invention, with water recovery;

FIG. 18: shows a schematic, enlarged representation of the air cooling device in FIG. 16; and FIG. 19: shows a schematic, enlarged representation of the air cooling device in FIG. 17.

FIGS. 1 to 7 show a first exemplary embodiment of a cooling apparatus 100 for cooling bulk material, in particular for cooling aggregates for concrete production. Said cooling apparatus 100 may be part of a mobile apparatus for concrete production as specified by the invention or it may be part of a retrofit kit according to the invention for adding to an existing aggregate processing plant, in particular to a plant for producing concrete. Cooling apparatus 100 is disposed in a frame 101 which preferably corresponds to a 10-foot high-cube container. This has the advantage that two cooling apparatus 100 can be combined to form a 20-foot transportation unit, preferably using "quick ties". The arrangement in a frame 101 has the additional advantage that the cooling apparatus 100 is easy to transport and can be combined with further modules of a mobile apparatus for concrete production.

The manner of operation and the components of cooling apparatus 100, as part of a mobile concrete mixing plant and as a retrofit kit for mobile or stationary concrete mixing plants are described in substantially the same way for both areas of application, and are therefore described here in unitary form. Identical or substantially identical components are marked in the Figures with the same reference signs.

The inventive cooling apparatus 100 comprises a bulk material hopper 110 in which bulk material is kept for dosing purposes and for further processing to make concrete. Bulk material is conveyed to cooling apparatus 100 via a conveyor belt 220, which does not belong to cooling apparatus 100, from a bulk material storage bunker or storage unit 230, which likewise does not belong to the cooling apparatus. Conveyor belt 220 is preferably infinitely variable.

In cooling apparatus 100, the aggregate initially arrives in a bulk material feeder 140. In the example shown here, said bulk material feeder 140 consists of a bulk material loosening device embodied as a vibrating conveyor 143 and a bulk material feeder shaft 142. The bulk material passes along a bulk material feeder path 141 (as indicated by arrow 141 in FIG. 3) via vibrating conveyor 143 and through bulk material feeder shaft 142 in order to reach bulk material hopper 110.

A wetting apparatus 120 is disposed along bulk material feeder path 141. Said wetting apparatus 120 has a plurality of water jets that distribute water as evenly as possible over the bulk material moving along bulk material feeder path 141, thus wetting the bulk material reliably and uniformly. It is preferable that cooled water is sprayed onto the bulk material by wetting apparatus 120.

Vibrating conveyor 143 loosens the bulk material so that there are fewer particles of bulk material and more air in any unit of volume along the bulk material feeder path than in a respective unit of volume in the bulk material hopper 110 filled with bulk material. Vibrating conveyor 143 thus causes bulk material being fed from bulk material hopper 110 along bulk material feeder path 141 to have a slightly lower density than the bulk material stored in bulk material hopper 110.

Along bulk material feeder path 141, the bulk material loosened in this manner has an at least partially vertical component of movement, in particular in bulk material feeder shaft 142 which is oriented slantingly upwards. In particular, the bulk material initially falls downwards in substantially free fall from vibrating conveyor 143 at least over part of the bulk material feeder path 141. In this way, the bulk material is wetted as evenly and reliably as possible on at least one part of bulk material feeder path 141 through the wetting apparatus 120.

The bulk material then reaches another vibrating conveyor 147 disposed in bulk material feeder shaft 142, said conveyor being designed as a zigzag vibrating conveyor and having a plurality of substantially horizontally arranged floors 145 *a, b, c* on which the bulk material is conveyed by vibration. A plurality of drop zones 146 *a, b, c, d* are disposed therebetween, onto which the bulk material falls downwards in substantially free fall to the next floor 145 *a, b, c*, or into bulk material hopper 110. The air supplied via a fan 131 flows through the additional vibrating conveyor 147 arranged in bulk material feeder shaft 142 in a direction opposite to that shown by arrow 141 (see FIG. 3). This configuration with a zigzag vibrating conveyor is particularly preferred because the wetted bulk material is conveyed advantageously along bulk material feeder path 141 in substantially free fall on several occasions, and the air supplied flows through it particularly well, which means that the bulk material can be cooled in an particularly effective and efficient manner.

As can be seen from FIGS. 6 and 7, in particular, cooling apparatus 100 is preferably disposed as part of a mobile apparatus for concrete production on a dosing substructure 210, with which the cooled bulk material 500 can be weighed out, dosed and transported to the place of deployment for further processing.

Air that has preferably been dried and cooled is supplied by an air supply apparatus 130 to cooling apparatus 100 and fed from below into bulk material hopper 110 via a fan 131. From there, the supplied air penetrates bulk material 500, which is located in the bulk material hopper 110 and which is already soaked as homogenously as possible, and proceeds through bulk material feeder shaft 142 as heated waste air enriched with water into a region 144 of broadened cross-section and preferably exits cooling apparatus 100 through an air discharge apparatus (not shown).

The path taken by the air through cooling apparatus 100 is shown in FIGS. 6 and 7 by arrows in cooling apparatus 100. As can be seen, said arrows run in the opposite direction to arrow 141 in FIG. 3. The cold air is sucked in by blower 131 and blown into bulk material hopper 110. Since bulk material hopper 110 is closed airtight, except for the outlet through bulk material feeder shaft 142, the air can only exit bulk material hopper 110 via zigzag vibrating conveyor 147 disposed in bulk material feeder shaft 142 and must thus flow through and around the bulk material 500 and/or particles of bulk material located in bulk material hopper 110 and entering through bulk material feeder shaft 142. Due to the zigzag vibrating conveyor 147 being preferably disposed in bulk material feeder shaft 142, and due to the concomitantly opposite directions in which the air and bulk material 500 flow, the flow of air around the particles of bulk material is especially good, thus achieving particularly efficient and effective cooling.

After the air has flowed through bulk material feeder shaft 142 from the bottom to the top, thereby absorbing heat and moisture from the particles of bulk material, it reaches an air outlet 144 where the flow velocity of the air is reduced. As a result, suspended matter and dust particles that might be transported as free particles in the air, fall back onto the vibrating conveyor, which means that the waste air being discharged is relatively clean. This has the advantage that, when drying and/or dehumidifying the waste air, and when recycling the water that is formed thereby, it is possible to dispense with complicated filtering.

FIGS. 8 to 13 show a second exemplary embodiment of a cooling apparatus 100' for a mobile concrete production apparatus, for cooling bulk material and in particular for cooling aggregates for concrete production. The second exemplary embodiment of cooling apparatus 100' corresponds in many respects to the first exemplary embodiment of cooling apparatus 100 as shown in FIGS. 1 to 7. It is also preferred that the features of the first and second embodiment be combined or swapped.

Identical or substantially identical aspects of the two embodiments shown are therefore shown with the same reference signs as in the first embodiment, with an apostrophe being suffixed in the second embodiment. In the following, reference shall be made in particular to aspects that are differently configured in the two embodiments.

In cooling apparatus 100', the aggregate firstly arrives in a bulk material feeder 140'. In the example shown here, bulk material feeder 140' consist of a bulk material loosening device in the form of a vibrating conveyor 143' and a bulk material feeder shaft 142'. A fall plate 221' prevents bulk material that arrives via conveyor belt 220' in bulk material feeder 140' from flying too far onto vibrating conveyor 143'. The bulk material moves along a bulk material feeder path 141' via vibrating conveyor 143' and through bulk material feeder shaft 142' to reach bulk material hopper 110'.

A wetting apparatus 120' is disposed along bulk material feeder line 141'. Said wetting apparatus 120' has a plurality of water jets that distribute water as evenly as possible over the bulk material moving along bulk material feeder path 141', thus wetting the bulk material reliably and uniformly. It is preferable that cooled water is sprayed onto the bulk material by wetting apparatus 120'.

Vibrating conveyor 143' loosens the bulk material such that there are fewer particles of bulk material and more air in a unit of volume along the bulk material feeder path than in a corresponding unit of volume in the bulk material hopper 110' filled with bulk material. Vibrating conveyor 143' thus causes the bulk material to be fed to the bulk material hopper 110' to have a lower density along the bulk material feeder path 141' than the bulk material stored in the bulk material hopper 110'.

The bulk material loosened in this manner has an least partially vertical component of movement along bulk material feeder path 141', in particular in the bulk material feeder shaft 142' oriented slantingly upwards. The bulk material falls, from vibrating conveyor 143', downwards in substantially free fall over at least part of bulk material feeder path 141'. In this way, the bulk material is wetted as evenly and reliably as possible on at least one part of bulk material feeder path 141' through wetting apparatus 120'.

As can be seen from FIGS. 12 and 13 in particular, cooling apparatus 100' is preferably disposed as part of a mobile apparatus for concrete production on a dosing substructure 210', with which the cooled bulk material can be weighed out, dosed and transported to the place of deployment for further processing.

Air that has preferably been dried and cooled is supplied by an air supply apparatus 130' to cooling apparatus 100' and fed from below into bulk material hopper 110' via a fan 131'. From there, the supplied air penetrates bulk material, which is located in the bulk material hopper 110' and which is already soaked as homogenously as possible, and proceeds through bulk material feeder shaft 142' as heated waste air enriched with water into a region 144' of broadened cross-section and preferably exits cooling apparatus 100' through an air discharge apparatus (not shown).

The path taken by the air through cooling apparatus 100' is shown in FIGS. 12 and 13 by arrows in cooling apparatus 100'. The cold air is sucked in by blower 131' and blown into bulk material hopper 110'. Since bulk material hopper 110' is closed airtight, except for the outlet through bulk material feeder shaft 142', the air can only exit bulk material hopper 110' via bulk material feeder shaft 142' and must thus flow through and around the bulk material 500' and/or particles of bulk material located in bulk material hopper 110' and entering through bulk material feeder shaft 142'. After the air has flowed through bulk material feeder shaft 142' from the bottom to the top, thereby absorbing heat and moisture from the particles of bulk material, it reaches a larger chamber 144' where the flow velocity of the air is reduced due to the larger cross-section of chamber 144'. As a result, suspended matter and dust particles that might be transported as free particles in the air, fall back onto the vibrating conveyor, which means that the waste air being discharged is relatively clean. This has the advantage that, when drying and/or dehumidifying the waste air, and when recycling the water that is formed thereby, it is possible to dispense with complicated filtering.

FIGS. 14 and 15 show two three-dimensional views of part of a mobile apparatus for concrete production according to the invention, from different perspectives. Two of the inventive cooling apparatuses 100a, 100b for cooling bulk material are arranged above a dosing substructure 210 in which cooled aggregates are weighed out, dosed and made available for further processing. Bulk material to be cooled, in particular sand and fine gravel from material storage hoppers 230a, 230b, is fed via conveyor belts 220a, 220b to cooling apparatuses 100a, 100b. Another aggregate cooler 300 suitable for aggregate with a larger particle size, such a coarse gravel, is likewise disposed on dosing substructure 210 and may also be configured as an aggregate cooler of the kind known from the prior art.

FIGS. 14 and 15 also show a precooler 410 and a chiller 420 for cooling water, which are provided as elements of a cooling circuit of the mobile concrete mixing plant according to the invention. The cooled water is stored in cold water tank 430. An air cooling device 440 is also present. The interrelationships between these components and their manner of operation are shown in more detail in FIGS. 16 to 19.

FIGS. 16 and 18 provide a schematic view of one variant of a cooling circuit of a mobile concrete mixing plant according to the invention, in which the waste air from cooling apparatus 100 escapes from the plant and ambient air is fed into air cooling device 440 via line 441. In this variant, the water consumption is higher but the energy consumption is lower, because the air does not need to be dehumidified, so less energy is also needed to cool the air, since the air is heated when the air is dehumidified.

The temperatures and humidity figures specified in the following by way of example are for a region with a hot climate, where aggregates stored in the surroundings have a temperature of approximately 40-50° C. and the air has a temperature of approximately 30-45° C., with a relative humidity of approximately 50-70%.

In the variant without water recovery, shown in FIGS. 16 and 18, an inventive cooling apparatus 100 for cooling bulk material is shown, in which aggregate with a temperature of approximately 40-50° C. is fed into a bulk aggregate hopper and cooled to approximately 15-25° C.

Air which has been cooled to approximately 10-20° C. moves from the air cooling device 440 via line 446 into cooling apparatus 100. The waste air discharged from cooling apparatus 100 has a temperature of approximately 40-50° C., with a relative humidity of up to 100%.

When the air is cooled, condensed water is formed and is channeled via line 448 at a temperature of approximately 25 to 40° C. into a water tank 450 into which fresh water can also be fed.

The water temperature in the fresh water tank is approximately 35-45° C. Pre-cooler 110 is fed from this fresh water tank with water at a temperature of approximately 35-45° C. Pre-cooler 410 cools the water down to a temperature of approximately 30-40° C. and feed chiller 420 with it. The chiller cools the water down further to approximately 5-15° C. and feeds it to the cold water tank in which the water has a temperature of approximately 4-15° C. The cold water can be fed from the cold water tank back to the chiller in a subcooling circuit, as shown by the broken arrows.

Heat exchanger 443 in air cooling device 440 is fed from cold water tank 430, and a supply line to the concrete mixing plant is fed from the cold water tank, which means that directly cooled water is also used for mixing concrete. The water provided from the cold water tank has a temperature of approximately 5-15° C.

Outside air 441 is fed into air cooling device 440. A condensed water container 444 from which the condensed water can be pumped or re-used via a water pump 447 and line 448, is disposed, in addition to air heat exchanger 443, in air cooling device 440. The air cooled in air heat exchanger 443 is supplied via a fan 445 and line 446 to cooling apparatus 100.

In the variant of a cooling circuit of an inventive mobile concrete mixing plant shown schematically in FIGS. 17 and 19, the waste air from cooling apparatus 100 is supplied via a line 442 to air cooling device 440. In this variant, the water consumption is lower because the water present as water vapour in the waste air condenses in in air cooling device 440 and is returned via line 448 to the water circuit. However, the air heats up when it is dried, with the result that a greater amount of energy is needed to cool the air in air cooling device 440.

The temperatures and humidity figures specified in the following by way of example are for a region with a hot climate, where aggregates stored in the surroundings have a temperature of approximately 40-50° C. and the air has a temperature of approximately 30-45° C., with a relative humidity of approximately 50-70%.

In the variant with water recovery, shown in FIGS. 17 and 19, an inventive cooling apparatus 100 for cooling bulk material is shown, in which aggregate with a temperature of approximately 40-50° C. is fed into a bulk aggregate hopper and cooled to a temperature lower than approximately 20° C.

Air which has been cooled to approximately 10-20° C. moves from the air cooling device 440 via line 446 into cooling apparatus 100. The waste air discharged from cooling apparatus 100 has a temperature of approximately 40-50° C., with a relative humidity of up to 100%.

When the air is cooled, condensed water is formed, and the amount thereof is greater in the case of waste air recycling than when ambient air is used, because the humidity of the waste air is greater than that of the ambient air. The condensed water which is formed is fed via line 448 at a temperature of approximately 30-40° C. into a water tank 450, into which fresh water can also be fed.

The water temperature in the fresh water tank is approximately 35-45° C. Pre-cooler 110 is fed from this fresh water tank with water at a temperature of approximately 35-45° C. Pre-cooler 410 cools the water down to a temperature of approximately 30-40° C. and feed chiller 420 with it. The chiller cools the water down further to approximately 5-15° C. and feeds it to the cold water tank in which the water has a temperature of approximately 4-15° C. The cold water can be fed from the cold water tank back to the chiller in a subcooling circuit, as shown by the broken arrows.

Heat exchanger 443 in air cooling device 440 is fed from cold water tank 430, and a supply line to the concrete mixing plant is fed from the cold water tank, which means that directly cooled water is also used for mixing concrete. The water provided from the cold water tank has a temperature of approximately below 10° C.

The warm waste air is fed into air cooling device 440 via line 442. A condensed water container 444 from which the condensed water can be returned via a water pump 447 and line 448 to the water circuit is disposed, in addition to air heat exchanger 443, in air cooling device 440. More condensed water is formed In the variant with water recovery, shown in FIGS. 17 and 19, than in the variant shown in FIGS. 16 and 18, due to the higher humidity of the waste air. The air which is cooled in air heat exchanger 443 is returned via a fan 445 and line 446 to cooling apparatus 100.

The invention claimed is:

1. A mobile apparatus for concrete production, comprising a cooling apparatus for evaporatively cooling bulk material, including aggregates for concrete production, said cooling apparatus comprising a bulk material hopper, a wetting apparatus and an air supply apparatus,
   characterised in that the cooling apparatus is disposed in a frame corresponding to a container, and
   the cooling apparatus has a bulk material feeder for feeding bulk material into the bulk material hopper via a bulk material feeder path, said bulk material feeder comprising a bulk material feeder shaft which extends upwards from the bulk material hopper and in which a zigzag vibrating conveyor is arranged, wherein bulk material to be fed is guided on several parts of the bulk material feeder path on a path of movement corresponding substantially to free fall of the bulk material,
   the bulk material feeder and the wetting apparatus being adapted and disposed in such a way that bulk material to be fed comes into contact on at least one part of the bulk material feeder path with water that is being discharged from the wetting apparatus, and is guided on said part of the bulk material feeder path on a path of movement corresponding substantially to free fall of the bulk material, and
   the bulk material hopper is closed airtight, except for the outlet through bulk material feeder shaft, such that the air blown into the bulk material hopper by the air supply apparatus can only exit the bulk material hopper via the zigzag vibrating conveyor in a direction opposite to the bulk material feeder path;
characterised by an air discharge apparatus; and
characterised in that the wetting apparatus, the air discharge apparatus and an air cooling device are adapted and disposed in such a way that an air outlet of the air discharge apparatus is connected to an air inlet of the air cooling device and a water outlet of the air cooling device is connected to a water inlet of the wetting apparatus.

2. The apparatus of claim 1,
   characterised by the air cooling device cooling the air to be supplied by means of the air supply apparatus.

3. The apparatus of claim 2,
   characterised in that the air cooling device includes an air dryer for drying the air to be supplied by the air supply apparatus.

4. The apparatus of claim 1,
   characterised by the water cooling device cooling the water to be supplied by the wetting apparatus.

5. A mobile apparatus for concrete production, comprising a cooling apparatus for evaporatively cooling bulk material, including aggregates for concrete production, said cooling apparatus comprising a bulk material hopper, a wetting apparatus and an air supply apparatus,
   characterised in that the cooling apparatus is disposed in a frame corresponding to a container, and
   the cooling apparatus has a bulk material feeder for feeding bulk material into the bulk material hopper via a bulk material feeder path, said bulk material feeder comprising a bulk material feeder shaft which extends upwards from the bulk material hopper and in which a zigzag vibrating conveyor is arranged, wherein bulk material to be fed is guided on several parts of the bulk material feeder path on a path of movement corresponding substantially to free fall of the bulk material, the bulk material feeder and the wetting apparatus being adapted and disposed in such a way that bulk material to be fed comes into contact on at least one part of the bulk material feeder path with water that is being discharged from the wetting apparatus, and is guided on said part of the bulk material feeder path on a path of movement corresponding substantially to free fall of the bulk material, and the bulk material hopper is closed airtight, except for the outlet through bulk material feeder shaft, such that the air blown into the bulk material hopper by the air supply apparatus can only exit the bulk material hopper via the zigzag vibrating conveyor in a direction opposite to the bulk material feeder path;

characterised by an air discharge apparatus; and characterised in that the air supply apparatus, the air discharge apparatus and an air cooling device are adapted and disposed in such a way that an air outlet of the air discharge apparatus is connected to an air inlet of the air cooling device and an air outlet of the air cooling device is connected to an air inlet of the air supply apparatus.

6. A mobile apparatus for concrete production, comprising a cooling apparatus for evaporatively cooling bulk material, including aggregates for concrete production, said cooling apparatus comprising a bulk material hopper, a wetting apparatus and an air supply apparatus, characterised in that the cooling apparatus is disposed in a frame corresponding to a container, and the cooling apparatus has a bulk material feeder for feeding bulk material into the bulk material hopper via a bulk material feeder path, said bulk material feeder comprising a bulk material feeder shaft which extends upwards from the bulk material hopper and in which a zigzag vibrating conveyor is arranged, wherein bulk material to be fed is guided on several parts of the bulk material feeder path on a path of movement corresponding substantially to free fall of the bulk material, the bulk material feeder and the wetting apparatus being adapted and disposed in such a way that bulk material to be fed comes into contact on at least one part of the bulk material feeder path with water that is being discharged from the wetting apparatus, and is guided on said part of the bulk material feeder path on a path of movement corresponding substantially to free fall of the bulk material, and the bulk material hopper is closed airtight, except for the outlet through bulk material feeder shaft, such that the air blown into the bulk material hopper by the air supply apparatus can only exit the bulk material hopper via the zigzag vibrating conveyor in a direction opposite to the bulk material feeder path;

characterised by a water cooling device for cooling the water to be supplied by the wetting apparatus; and characterised in that an air cooling device and the wetting apparatus are adapted and disposed in such a way that a water outlet of the air cooling device is connected to a water inlet of the wetting apparatus, the water outlet of the air cooling device being connected via the water cooling device to the water inlet of the wetting apparatus.

7. A mobile apparatus for concrete production, comprising a cooling apparatus for evaporatively cooling bulk material, including aggregates for concrete production, said cooling apparatus comprising a bulk material hopper, a wetting apparatus and an air supply apparatus, characterised in that the cooling apparatus is disposed in a frame corresponding to a container, and the cooling apparatus has a bulk material feeder for feeding bulk material into the bulk material hopper via a bulk material feeder path, said bulk material feeder comprising a bulk material feeder shaft which extends upwards from the bulk material hopper and in which a zigzag vibrating conveyor is arranged, wherein bulk material to be fed is guided on several parts of the bulk material feeder path on a path of movement corresponding substantially to free fall of the bulk material, the bulk material feeder and the wetting apparatus being adapted and disposed in such a way that bulk material to be fed comes into contact on at least one part of the bulk material feeder path with water that is being discharged from the wetting apparatus, and is guided on said part of the bulk material feeder path on a path of movement corresponding substantially to free fall of the bulk material, and the bulk material hopper is closed airtight, except for the outlet through bulk material feeder shaft, such that the air blown into the bulk material hopper by the air supply apparatus can only exit the bulk material hopper via the zigzag vibrating conveyor in a direction opposite to the bulk material feeder path; and characterised by a water cooling circuit in which the following components are arranged in series:

a fresh water tank,
preferably a precooler,
a chiller,
a cold water tank and
an air cooling device, the water cooling circuit and its components being adapted and disposed in such a way that a water inlet of the air cooling device is connected to a water outlet of the cold water tank and/or a water outlet of the air cooling device is connected a water inlet of the fresh water tank and/or a water outlet of the cold water tank is connected to a water inlet of the wetting apparatus.

8. A method for concrete production, in which bulk material, namely including aggregates for concrete production, are cooled by evaporation, said cooling comprising the steps of:

storing bulk material in a bulk material hopper,
wetting the bulk material,
feeding the bulk material via a bulk material feeder path, in a bulk material feeder shaft which extends upwards from the bulk material hopper and in which a zigzag vibrating conveyor is arranged, wherein bulk material to be fed is guided on several parts of the bulk material feeder path on a path of movement corresponding substantially to free fall of the bulk material, and
adding air to the bulk material hopper,
the wetting step being performed on at least one part of the bulk material feeder path and the bulk material being guided on said part of the bulk material feeder path on a path of movement corresponding substantially to free fall of the bulk material,
the bulk material hopper being closed airtight, except for the outlet through bulk material feeder shaft, such that the air can only exit the bulk material hopper via the zigzag vibrating conveyor in a direction opposite to the bulk material feeder path; and using water formed when cooling discharged air for wetting the bulk material.

9. The method of claim 8, characterised by the step of:

cooling the discharged air.

10. The method of claim 9, characterised in that cooling of the discharged air also includes drying the discharged air.

11. The method of claim 9, characterised by the step of:

using the cooled discharged air for supplying adding the air.

12. The method of the claim 8, characterised in the water formed when cooling the discharged air is cooled before and/or during its use in wetting bulk material.

\* \* \* \* \*